(12) United States Patent
Levitan

(10) Patent No.: US 6,480,814 B1
(45) Date of Patent: Nov. 12, 2002

(54) METHOD FOR CREATING A NETWORK MODEL OF A DYNAMIC SYSTEM OF INTERDEPENDENT VARIABLES FROM SYSTEM OBSERVATIONS

(76) Inventor: Bennett Simeon Levitan, 12 Agua Sarca Rd., Placitas, NM (US) 87043

( * ) Notice: Subject to any disclaimer, the term of this patent is extended or adjusted under 35 U.S.C. 154(b) by 0 days.

(21) Appl. No.: 09/301,615

(22) Filed: Apr. 29, 1999

Related U.S. Application Data

(60) Provisional application No. 60/105,620, filed on Oct. 26, 1998.

(51) Int. Cl.[7] .................. G06F 7/60; G06F 17/10; G06F 101/00
(52) U.S. Cl. .................. 703/2; 703/3; 703/11; 706/60
(58) Field of Search .................. 703/3, 11, 6, 19, 703/21, 1–2; 706/60, 34; 359/139; 379/112; 382/157

(56) References Cited

U.S. PATENT DOCUMENTS

| | | | | |
|---|---|---|---|---|
| 4,866,634 A | * | 9/1989 | Reboh et al. .................. | 706/60 |
| 4,874,963 A | * | 10/1989 | Alspector .................. | 706/34 |
| 5,311,345 A | * | 5/1994 | Cloonan et al. .................. | 359/139 |
| 5,724,557 A | * | 3/1998 | McBean, Sr. .................. | 395/500.07 |
| 5,764,740 A | * | 6/1998 | Holender .................. | 379/112 |
| 5,850,470 A | * | 12/1998 | Kung et al. .................. | 382/157 |
| 6,076,083 A | * | 6/2000 | Baker .................. | 706/45 |

OTHER PUBLICATIONS

Patrik D'haeseller, Xiling Wen, Stefanie Furhman and Roland Somogyi, *Mining the Gene Expression Matrix: Inferring Gene Relationships From Large Scale Gene Expression Data*, Apr. 17, 1998, www:http//www.cs.unm.edu/~patrik.

S. Liang, Reveal, a General Reverse Engineering Algorithm for Inference of Genetic Network Architectures. In *Pacific Symposium on Biocomputing*, vol. 3, pp. 18–29, 1998.

R. Somogyi, S. Fuhrman, M. Ashkenazi, and A. Wuensche. The Gene Expression Matrix: Towards the Extraction of Genetic Network Architectures. In *Proc. Of the Second World Congress of Nonlinear Analysis (WCNA96)*, 30(3):1815–1824, 1997.

Daniel B. Carr, Roland Somogyi and George Michaels, Templates for Looking at Gene Expression clustering, *Statistical Computing & Statistical Graphics Newsletter*, Apr. 20–29, 1997.

(List continued on next page.)

Primary Examiner—Kevin J. Teska
Assistant Examiner—Samuel Broda
(74) Attorney, Agent, or Firm—Pennie & Edmonds LLP

(57) ABSTRACT

The present invention provides a method to create a Boolean or multilevel logic network model of a dynamic system of interdependent variables from observed system states transitions that can (1) operate with data consisting of only a fraction of all possible transitions,
(2) accommodate measurement error on these transitions
(3) produce a probability distribution over network functions (rather than simply giving one set of network functions that match the data)
(4) support asynchronous activation times for different genes
(5) support varying delays between gene activation and gene expression for different genes
(6) accommodate the stochastic nature of gene network operations
(7) support varying degrees of gene activation (not simply Boolean activation states) and
(8) incorporate prior knowledge of the nature and limitations of the actual network functions being modeled.

48 Claims, 7 Drawing Sheets

| $f_i(\bar{z})$ | prior | likelihood | | posterior | |
|---|---|---|---|---|---|
| | | $x_0$ | $\bar{x}_0$ | $x_0$ | $\bar{x}_0$ |
| 0 | 0 | 0.180 | 0.040 | 0 | 0 |
| 1 | 0 | 0.080 | 0.640 | 0 | 0 |
| $x_0$ | 0.1875 | 0.213 | 0.068 | 0.468 | 0.049 |
| $\bar{x}_0$ | 0.1875 | 0.133 | 0.548 | 0.105 | 0.396 |
| $x_1$ | 0.1875 | 0.558 | 0.177 | 0.439 | 0.128 |
| $\bar{x}_1$ | 0.1875 | 0.058 | 0.237 | 0.045 | 0.171 |
| $x_0 x_1 + x_0 \bar{x}_1$ | 0.0125 | 0.487 | 0.198 | 0.026 | 0.010 |
| $\bar{x}_0 x_1 + x_0 \bar{x}_1$ | 0.0125 | 0.087 | 0.246 | 0.005 | 0.012 |
| $x_0 x_1$ | 0.0281 | 0.221 | 0.051 | 0.026 | 0.006 |
| $x_0 \bar{x}_1$ | 0.0281 | 0.176 | 0.054 | 0.021 | 0.006 |
| $\bar{x}_0 x_1$ | 0.0281 | 0.523 | 0.161 | 0.062 | 0.017 |
| $\bar{x}_0 \bar{x}_1$ | 0.0281 | 0.078 | 0.211 | 0.009 | 0.023 |
| $x_0 + x_1$ | 0.0281 | 0.518 | 0.217 | 0.061 | 0.024 |
| $x_0 + \bar{x}_1$ | 0.0281 | 0.063 | 0.275 | 0.007 | 0.030 |
| $\bar{x}_0 + x_1$ | 0.0281 | 0.136 | 0.588 | 0.016 | 0.064 |
| $\bar{x}_0 + \bar{x}_1$ | 0.0281 | 0.081 | 0.597 | 0.010 | 0.065 |

OTHER PUBLICATIONS

Harley H. McAdams and Adam Arkin, Stochastic Mechanisms In Gene Expression, *Proc. Natl. Acad. Sci USA*, vol. 94, pp. 814–819, Feb. 1997, Biochemistry.

Michael C. MacLeod, A Possible Role in Chemical Carcinogenesis for Epigenetic, Heritable Changes in Gene Expression, *Molecular Carcinogenesis*, 15:241–250, Wiley–Liss, Inc., 1996.

Roland Somogyi and Caxol Ann Sniegoski, *Modeling the Complexity of Genetic Networks: Understanding Multigenic and Pleiotropic Regulation*, Complexity, John Wiley & Sons, Inc., 45–63, 1996.

A. Shaw, *Gene Regulation and the Origin of Cancer: A New Model*, Medical Hypothesis 1995, 45, 398–402.

Staurt Kauffman, *The Origins of Order,* Oxford University Press, New York, 1993, Chapter 5 and Chapter 12.

Renato Dulbecco, Cancer Progressions: The Ultimate Challenge, Int. J. Cancer: Supplement 4, 6–9 1989.

* cited by examiner

| $t$ | $x_0$ | $x_1$ | $x_2$ |
|---|---|---|---|
| 0 | 0 | 0 | 0 |
| 1 | 0 | 0 | 1 |
| 2 | 0 | 1 | 1 |
| 3 | 1 | 1 | 1 |
| 4 | 0 | 1 | 0 |
| 5 | 1 | 1 | 1 |

| $N$ | Number $q$ | Number KB |
|---|---|---|
| 1 | 2 | 1 |
| 10 | $1.02 \times 10^4$ | $1.00 \times 10^1$ |
| 20 | $2.10 \times 10^7$ | $2.05 \times 10^4$ |
| 30 | $3.22 \times 10^{10}$ | $3.15 \times 10^7$ |
| 100 | $1.27 \times 10^{32}$ | $1.24 \times 10^{29}$ |
| 300 | $6.11 \times 10^{92}$ | $5.97 \times 10^{89}$ |

FIG. 3

| $t$ | $x_0$ | $x_1$ |
|---|---|---|
| $\tau - 8$ | - | - |
| $\tau - 7$ | 1 | - |
| $\tau - 6$ | - | - |
| $\tau - 5$ | - | - |
| $\tau - 4$ | - | 1 |
| $\tau - 3$ | - | 1 |
| $\tau - 2$ | - | 1 |
| $\tau - 1$ | - | - |
| $\tau$ | - | - |
| ⋮ | | |

FIG. 4

| | K | C | P | prior | likelihood | | posterior | |
|---|---|---|---|---|---|---|---|---|
| | | | | | $x_0$ | $x_1$ | $x_0$ | $x_1$ |
| 0 | 0 | 0 | 1 | 0 | 0 | 0 | 0 | 0 |
| 1 | 0 | 0 | 1 | 0 | 0 | 1 | 0 | 0.0000 |
| $x_0$ | 1 | 1 | 0.5 | 0.1875 | 0 | 0 | 0 | 0 |
| $\overline{x}_0$ | 1 | 1 | 0.5 | 0.1875 | 0 | 1 | 0 | 0.7694 |
| $x_1$ | 1 | 1 | 0.5 | 0.1875 | 1 | 0 | 0.7319 | 0 |
| $\overline{x}_1$ | 1 | 1 | 0.5 | 0.1875 | 0 | 0 | 0 | 0 |
| $\overline{x}_0 x_1 + x_0 \overline{x}_1$ | 2 | 0 | 0.5 | 0.0125 | 1 | 0 | 0.0488 | 0 |
| $\overline{x}_0 \overline{x}_1 + x_0 x_1$ | 2 | 0 | 0.5 | 0.0125 | 0 | 0 | 0 | 0 |
| $x_0 x_1$ | 2 | 2 | 0.75 | 0.0281 | 0 | 0 | 0 | 0 |
| $x_0 \overline{x}_1$ | 2 | 2 | 0.75 | 0.0281 | 0 | 0 | 0 | 0 |
| $\overline{x}_0 x_1$ | 2 | 2 | 0.75 | 0.0281 | 1 | 0 | 0.1097 | 0 |
| $\overline{x}_0 \overline{x}_1$ | 2 | 2 | 0.75 | 0.0281 | 0 | 0 | 0 | 0 |
| $x_0 + x_1$ | 2 | 2 | 0.75 | 0.0281 | 1 | 0 | 0.1097 | 0 |
| $x_0 + \overline{x}_1$ | 2 | 2 | 0.75 | 0.0281 | 0 | 0 | 0 | 0 |
| $\overline{x}_0 + x_1$ | 2 | 2 | 0.75 | 0.0281 | 0 | 1 | 0 | 0.1153 |
| $\overline{x}_0 + \overline{x}_1$ | 2 | 2 | 0.75 | 0.0281 | 0 | 1 | 0 | 0.1153 |

FIG. 5

| $t$ | $x_0$ | $x_1$ | $x_2$ |
|---|---|---|---|
| $\tau - 6$ | 1 | - | - |
| $\tau - 5$ | - | - | - |
| $\tau - 4$ | - | 1 | - |
| $\tau - 3$ | - | - | - |
| $\tau - 2$ | - | - | - |
| $\tau - 1$ | - | - | - |
| $\tau$ | - | - | 1 |

FIG. 6

| $f_i(\vec{x})$ | prior | likelihood | | posterior | |
|---|---|---|---|---|---|
| | | $x_1$ | $\bar{x}_1$ | $x_1$ | $\bar{x}_1$ |
| 0 | 0 | 0.180 | 0.040 | 0 | 0 |
| 1 | 0 | 0.080 | 0.640 | 0 | 0 |
| $x_0$ | 0.1875 | 0.213 | 0.068 | 0.168 | 0.049 |
| $\bar{x}_0$ | 0.1875 | 0.133 | 0.548 | 0.105 | 0.396 |
| $x_1$ | 0.1875 | 0.558 | 0.177 | 0.439 | 0.128 |
| $\bar{x}_1$ | 0.1875 | 0.058 | 0.237 | 0.045 | 0.171 |
| $\bar{x}_0 x_1 + x_0 \bar{x}_1$ | 0.0125 | 0.487 | 0.198 | 0.026 | 0.010 |
| $\bar{x}_0 \bar{x}_1 + x_0 x_1$ | 0.0125 | 0.087 | 0.246 | 0.005 | 0.012 |
| $x_0 x_1$ | 0.0281 | 0.221 | 0.051 | 0.026 | 0.006 |
| $x_0 \bar{x}_1$ | 0.0281 | 0.176 | 0.054 | 0.021 | 0.006 |
| $\bar{x}_0 x_1$ | 0.0281 | 0.523 | 0.161 | 0.062 | 0.017 |
| $\bar{x}_0 \bar{x}_1$ | 0.0281 | 0.078 | 0.211 | 0.009 | 0.023 |
| $x_0 + x_1$ | 0.0281 | 0.518 | 0.217 | 0.061 | 0.024 |
| $x_0 + \bar{x}_1$ | 0.0281 | 0.063 | 0.275 | 0.007 | 0.030 |
| $\bar{x}_0 + x_1$ | 0.0281 | 0.136 | 0.588 | 0.016 | 0.064 |
| $\bar{x}_0 + \bar{x}_1$ | 0.0281 | 0.081 | 0.597 | 0.010 | 0.065 |

FIG. 7

METHOD FOR CREATING A NETWORK MODEL OF A DYNAMIC SYSTEM OF INTERDEPENDENT VARIABLES FROM SYSTEM OBSERVATIONS

This application claims benefit of provisional application serial no. 60/105,620 filed Oct. 26, 1998.

FIELD OF THE INVENTION

The present invention relates generally to the creation of a network model of a dynamic system of interdependent variables from observed system transitions. More particularly, the present invention creates a network model from observed data by calculating a probability distribution over temporally dependent or high-order Markovian, Boolean or multilevel logic network rules to represent a dynamic system of interdependent variables from a plurality of observed, possibly noisy, state transitions.

BACKGROUND

Genetic regulatory networks (GRN) model systems of interdependent variables which change over time. A GRN comprises a plurality of variables, a system state defined as the value of the plurality of variables, and a plurality of regulatory rules corresponding to the plurality of variables which determine the next system state from previous system states. GRNs can model a wide variety of real world systems such as the interacting components of a company, the conflicts between different members of an economy and the interaction and expression of genes in cells and organisms.

Genes contain the information for constructing and maintaining the molecular components of a living organism. Genes directly encode the proteins which make up cells and synthesize all other building blocks and signaling molecules necessary for life. During development, the unfolding of a genetic program controls the proliferation and differentiation of cells into tissues. Since the function of a protein depends on its structure, and hence on its amino acid sequence and the corresponding gene sequence, the pattern of gene expression determines cell function and hence the cell's system state and the rules by which the state is changed.

In a GRN representing the interaction and expression of genes in cells and single-cell organisms, the variables represent the activation states of the genes, measured by the number of messenger RNA (MRNA) transcripts of the gene made per unit time or the number of proteins translated from the mNRAs per unit time. The regulatory rules are determined by the transcription regulatory sites next to each gene and the interactions between the gene products and these sites. The binding of molecules to these sites in various combinations and concentrations determines the degree of expression of the corresponding gene. Since these molecules are proteins or RNA's made by other genes, the network rules are functions of the activation states of the genes which they control. Genes are constantly exposed to varying concentrations of these controlling substances, so such a system can be considered as a GRN with an asynchronous, continuous time update rule.

The GRN of a system is the most critical information needed to diagnose and control it. In a complex system with many interacting components and rules, it is generally impossible to tell which components are the most critical without knowing its GRN. FIG. 1 illustrates this concept with a simple genetic regulatory network with N=3 genes. The arrows show functional dependence. The genes are updated continuously with gene A dependent on time and genes B and C dependent on the gene states. The update rules are $A(t)=\sin(wt)+0.5$, $B(t)=C(t)A(t)$, $C(t)=e^{-A(t)}$. A naive view of the system in FIG. 1 might be that inhibiting the activation of A will lessen the activation of B since B is activated in proportion to A's activation. However, inhibiting A activates C, which in turn increases the activation of B. In fact, as A is activated from being off, B is first activated with increasing A and then, past a threshold value of A, deactivated with increasing A. Accordingly, without knowledge of the GRN, knowledge of the direct relationship between two genes is insufficient to see how one influences the other.

Identifying the GRN representing the interaction and expression of genes in a class of cells is of fundamental importance for medical diagnostic and therapeutic purposes. For example, normal and cancerous cells may have identical surface markers and surface receptors and can be difficult to distinguish with chemotherapeutic agents. A GRN model of the interaction and expression of genes in the cells can indicate functional differences between normal and cancerous cells that provide a basis for differentiation not dependent on cell surface markers. The GRN also provides a means to identify the receptors or genetic targets to which molecule design techniques such as combinatorial chemistry and high throughput screening should be directed to achieve given functional effects. Such techniques are frequently used now, and pharmaceutical and biotechnology companies suffer from uncertainty as to which targets and receptors are worthy of study. The approach described below can greatly assist in this process. See Gene Regulation and the Origin of Cancer: A New Method, A. Shah, Medical Hypothesis (1995) 45,398–402 and Cancer progression: The Ultimate Challenge, Renato Dubbecco, Int. J. Cancer: Supplement 4, 6–9 (1989).

Generally, one does not have direct knowledge of the GRN regulatory rules and can only view the system states over time or after controlled interventions. The problem of inferring the regulatory rules from a succession of observed system states is known as the inverse genetic regulatory network problem. The inverse genetic regulatory network problem presents many difficulties. First, genes are expressed to different degrees and their protein and mRNA products vary over a wide range of concentrations. Second, genes express their products at varying times after their activation. Third, genes are activated at any time, not at regular time intervals. Fourth, the genes in a genome are not activated simultaneously, whatever the regularity of activation time intervals. Fifth, genetic systems have many influences which are unknown nor cannot be modeled. Sixth, the interaction and expression of genes in cells and organisms are often stochastic processes. Seventh, measurement error often hinders proper measurement of the system states. Eighth, in such large systems as mammalian genomes, it is not presently possible to measure the expression levels of all genes or relevant molecules. Likewise, it is not possible to acquire state transition information by putting cells into arbitrary genetic expression system states to observe their reactions, as most gene expression patterns will kill a cell. Thus, the inverse GRN problem can be extremely difficult.

Previous solutions to the inverse genetic regulatory network problem address some of these difficulties to varying degrees. One solution deals with the asynchronous nature of the system by modeling rule behaviors with "logical parameters," which serve to determine the relative strength and, hence, activation order of the network rules. See E. H. Snoussi and R. Thomas, Logical identification of all steady states: The concept of feedback loop characteristic states, *Bul. Math. Biol.*, 55:973–991, (1993). While logical parameters mixed with multilevel logic works well at modeling asynchronous system with time lags, they cause the discrete time steps of the model to correspond to different actual time periods, depending on which gene functions are being activated. This effect makes converting the number of transitions to actual elapsed time difficult or impossible and limits the utility of this approach in analyzing real data.

Other approaches can create complete GRNs when only a fraction of the state transitions are observed. One such approach assumes a particular form of the regulatory rules and modifies them in a particular fashion until they match the observed transitions. See, R. Somogyi, S. Fuhrman, M. Ashkenazi, and A. Wuensche. The gene expression matrix: Towards the extraction of genetic network architectures. In *Proc. Of the Second World Congress of Nonlinear Analysis (WCNA96)*. Elsevier Science, 1996. Another such approach uses the "mutual information" between sites, a statistical measure of how the value of one site dictates that of another, to build a map of the network rules. See, S. Liang, REVEAL, A general reverse engineering algorithm for inference of genetic network architectures. In *Pacific Symposium on Biocomputing*, Vol. 3, pp. 18–29, 1998. However, these approaches are unable to distinguish between known and unknown transitions. With the limited data available from genetic experiments, the vast majority of transitions between states will be unknown; and these methods will yield transitions with many incorrect, tacitly assumed transitions from those not in the data. Hence, this inability leads to dangerously misleading results when applying the resulting network, such as when inferring the controlling regulatory sites in a cancerous cell.

Accordingly, there exists a need for a method to create network models of dynamic systems of interdependent variables from observed system transition that can:

(1) operate with data consisting of only a fraction of all possible transitions,
(2) accommodate measurement error on these transitions
(3) produce a probability distribution over network functions (rather than simply giving one set of network functions that match the data)
(4) support asynchronous activation times for different genes
(5) support varying delays between gene activation and gene expression for different genes
(6) accommodate the stochastic nature of gene network operations
(7) support varying degrees of gene activation (not simply Boolean activation states).

SUMMARY OF THE INVENTION

The present invention provides a method to create a Boolean or multilevel logic network model of a dynamic system of interdependent variables from observed system states transitions that can (1) operate with data consisting of only a fraction of all possible transitions,
(2) accommodate measurement error on these transitions
(3) produce a probability distribution over network functions (rather than simply giving one set of network functions that match the data)
(4) support asynchronous activation times for different genes
(5) support varying delays between gene activation and gene expression for different genes
(6) accommodate the stochastic nature of gene network operations
(7) support varying degrees of gene activation (not simply Boolean activation states) and
(8) incorporate prior knowledge of the nature and limitations of the actual network functions being modeled.

It is an aspect of the present invention to provide a method for creating a network model of a real world system of interacting components having a plurality of expression levels from prior knowledge and a plurality of observations of the real world system comprising the steps of:

defining N network variables $x_i$, i=0, ... N−1 having values, $v_i$, i=1, ... m to represent the components of the real world system, said values defining a network state of said network model;

defining N network rules $f_i$, i=0 ... N−1 corresponding to said N network variables from a space of possible network rules wherein said N network rules have outputs defining said network model;

defining N prior distributions corresponding to said N network rules expressing probabilities of said possible network rules from the prior knowledge of the real world system;

defining at least one likelihood function expressing the probability of making the system observations for said possible network rules; and defining N posterior distributions as a product of said prior distributions and said at least one likelihood function wherein said posterior distributions express the probabilities of said possible network rules given the prior knowledge and the plurality of observations of the real world system.

It is a further aspect of the present invention to provide a method wherein said defining N prior distributions step comprises the step of defining said N prior probability distributions as an expression of a plurality of abstract properties of said N network rules.

It is a further aspect of the present invention to provide a method for creating a network model of a real world system of interacting components having a plurality of expression levels from prior knowledge and a plurality of observations of the real world system comprising the steps of:

defining N network variables $x_i$, i=0, ... N−1 having values, $v_i$, i=1, ... m to represent the components of the real world system, said values defining a network state of said network model;

defining N activation delays $T_i^{0 \to 1}$, i=0 ... N−1, corresponding to said N network variables $x_i$, i=0, ... N−1 from a space of possible activation delays; and defining N deactivation delays $T_i^{1 \to 0}$, i=0 ... N−1, corresponding to said N network variables $x_i$, i=0, ... N−1 from a space of possible deactivation delays;

defining N network rules $f_i$, i=0, ... N−1 corresponding to said N network variables from a space of possible network rules wherein said N network rules have outputs defining said network model; and defining at least one posterior distribution wherein said posterior distribution expresses the probabilities of said possible network rules, said possible activation delays and said possible deactivation delays given the prior knowledge and the plurality of observations of the real world system.

BRIEF DESCRIPTION OF THE DRAWINGS

FIG. 3 displays a table of storage requirements for bit representations of the Boolean functions of a Boolean network model with different numbers N of Boolean variables.

FIG. 4 displays a table of observed state transitions for a synchronous, GRN having a Markovian order of at least three and having N=2 Boolean variables.

FIG. 5 illustrates the probability distribution over all possible Boolean functions in a network model with N=2 Boolean variables, determined from a plurality of system state transitions without noise.

FIG. 6 displays a table of observed state transitions for a synchronous GRN having N=3 variables and a Markovian order which is at least four and can be as high as six.

FIG. 7 illustrates the probability distribution over all possible Boolean functions in a network model with N=2 Boolean variables, determined from a plurality of system state transitions with noise.

DETAILED DESCRIPTION OF THE PREFERRED EMBODIMENT

The present invention presents methods to create network models of dynamic systems of interdependent variables from observed state transitions. Without limitation, the following embodiments of the invention are described in the illustrative context of a solution using genetic regulatory networks (GRNs). However, it is apparent to persons of ordinary skill in the art that other models could be used to embody the aspects of the present invention which include the creation of network models from observed data by calculating a probability distribution over temporally dependent or high-order Markovian, Boolean or multilevel logic network rules to represent dynamic systems of interdependent variables from a plurality of observed, possibly noisy, state transitions.

A first embodiment of the present invention presents a method to create a synchronous deterministic Boolean network model of a dynamic system of interdependent variables from a plurality of observed, noiseless system state transitions. In this idealization, each of the N genes has only two possible values, labeled 0 and 1 for simplicity. The network functions are Boolean functions of any number of the N genes, and all the genes are updated simultaneously at time t based on the system's state at time t−1. The network rules are deterministic, and any observation of the system state is correct with no error. The system can be regarded as a finite state automaton with $2^N$ states.

Figures 1, 2:
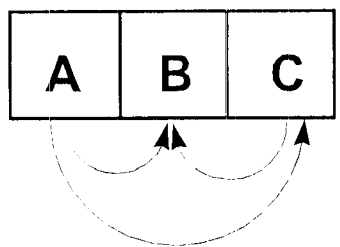
FIG. 1 illustrates a generic genetic regulatory network (GRN) with N=3 genes.
FIG. 2 displays a table of system state transitions for a GRN with N=3 variables.

More precisely, a Boolean network model of a GRN can be defined as a set of N Boolean variables or sites $x_i$, i=0, ... N−1 and N corresponding Boolean functions $f_i$, i=0 ... N−1. Function $f_i$ gives the next value of $x_i$ given the present values of all N variables. More formally, $$x_i^t = f_i(\vec{x}^{t-1}), i = 0, \ldots N-1 \qquad (1)$$

where t is the discrete time for the system, $x_i^t$ is the state of site i at time t, and $\vec{x}^{t-1}$ is the state of all variables at previous time step t−1. In general, a function $f_i$ is a function of only one or a small number of the N sites, though the particular sites may be scattered throughout the network. A simple N=3 example is defined by the functions $$x_0^t = f_0(\vec{x}^{t-1}) = \overline{x_0^{t-1}} x_1^{t-1}$$

$$x_1^t = f_1(\vec{x}^{t-1}) = x_1^{t-1} + x_2^{t-1}$$

$$x_2^t = f_2(\vec{x}^{t-1}) = \overline{x_0^{t-1}} \qquad (2)$$

where multiplication indicates a logical and, a plus sign indicates a logical or, and an overbar indicates a logical not or complement. FIG. 2 displays a table of system state transitions for a GRN with N=3 variables for the initial state of the system $\vec{x}^0$=000. These system state transitions are computed by iteratively evaluating the functions.

As is well-known for all types of dynamical systems, these networks demonstrate attractors and basins of attraction. See Stephen E. Harris, Bruce K. Sawhill, Andrew Wuensche, and Stuart A. Kauffman, Biased eukaryotic gene regulation rules suggest genome behavior is near edge of chaos, Technical Report 97-05-039, Santa Fe Institute, 1997 (Harris et al.); Roland Somogyi and Caxol Ann Sniegoski, Modeling the complexity of genetic networks: Understanding multigenic and pleiotropic regulation, Complexity, 1(6) :45–63, 1996; Staurt Kauffman, *The Origins of Order*, Oxford University Press, New York, 1993 (Kauffman). An attractor is a state or set of states to which the system moves and then remains within for all future generations. A basin of attraction is the set of states that eventually lead to a given attractor. In the series of states shown above, it is clear that states 010 and 111 form a 2-state cyclic attractor, and that states 000, 001 and 011 are in its basin of attraction. In this particular example, this is the only attractor and all states are within its basin. In general, a system can have between 1 and $2^N$ attractors with basins ranging from the entire space to individual states.

Since an arbitrary set of transitions may not occur consecutively in the observed system, transitions from state $\vec{x}$ to state $\vec{y}$ will be noted with a superscript to indicate the number of the transition and a subscript to indicate one of the N sites or variables in the system state. The inverse genetic regulatory network (GRN) problem is to find the functions $f=[f_0, f_1, \ldots f_{n-1}]$ given only a set of transitions between states $\vec{x}^j \to \vec{y}^j$, j=1 ... n. The implicit goals of the inverse GRN problem are determining which sites each site depends on and determining the functional forms of the relationships. The present invention finds both types of information simultaneously.

The canonical form to express function $f_i$ is a table in which the output states for each of the input states $\vec{x}$ is listed separately. Ones and zeros in the table indicate the output of the function for the corresponding input. Such a table can be expressed more succinctly as $$x_i^t = f_i(\vec{x}^{t-1}) = \bigvee_{\vec{\omega} \in Z^N} q_i^{\vec{\omega}} \bigwedge_{k=0}^{N-1} NOT^{\omega_k}(x_k^{t-1}) \qquad (3)$$

where the $\vee$ represents the logical OR operation, $\wedge$ represents the logical AND operation, $Z^N$ is the space of all binary sequences of length N and $$NOT^{\omega}(x) = \begin{cases} x: & \omega = 1 \\ \overline{x}: & \omega = 0. \end{cases} \qquad (4)$$

The sum over $Z^N$ in Eqn. 3 includes all combinations of compliments of the N components in $\vec{x}$. For the N=3 case, Eqn. 3 is $$f_i(\vec{x}) = q_i^{000} \overline{x_0} \overline{x_1} \overline{x_2} + q_i^{001} \overline{x_0} \overline{x_1} x_2 +$$

$$q_i^{010} \overline{x_0} x_1 \overline{x_2} + q_i^{011} \overline{x_0} x_1 x_2 +$$

$$q_i{}^{100}\bar{x}_0\bar{x}_1\bar{x}_2+q_i{}^{101}\bar{x}_0\bar{x}_1 x_2+$$
$$q_i{}^{110}x_0\bar{x}_1\bar{x}_2+q_i{}^{111}x_0\bar{x}_1 x_2+ \qquad (5)$$

where t has been omitted for clarity. $q_i^{\vec{x}}$ is a binary value which determines the response of site i to input $\vec{x}$. $q_i^{\vec{x}}=1$ means $x_i^t=1$ when $\vec{x}^{t-1}=\vec{x}$, and $q_i^{\vec{x}}=0$ means $x_i^t=0$ when $\vec{x}^{t-1}=\vec{x}$. For notational purposes, $Q_i=\{q_i^{\vec{x}}, \vec{x}\in Z^N\}$ and $Q=\{Q_i, i=0\ldots N-1\}$. Q completely determines the Boolean functions for the network, and the inverse problem can be summarized as finding Q.

Since this ideal GRN is deterministic and noiseless, when presented with a series of transitions $\vec{x}^j \to \vec{y}^j$, $j=1\ldots n$ finding the corresponding components of Q is trivial. Each transition from state $\vec{x}^j$ to state $\vec{y}^j$ gives the N values for $q_i^{\vec{x}j}$, $i=0\ldots N-1$. If all transitions are observed, all q values are known and the inverse problem is solved.

Storing this bit representation can be difficult. FIG. 3 displays a table of storage requirements for bit representations of the Boolean functions of a Boolean network model with different numbers N of Boolean variables. As illustrated by FIG. 3, there are $N2^N$ Boolean q values, and storing them in a computer is unreasonable for typical sizes of GRNs. The first embodiment of the present invention addresses the storage problem with a representation of the current state of knowledge on possible network functions as transition data is processed. This representation is based on defining $f_i$ as $$f_i = \begin{cases} 0: & g_i = 1 \\ 1: & h_i = 1 \\ u: & \text{otherwise.} \end{cases} \qquad (6)$$

where $g_i$ and $h_i$ are Boolean functions of variables $x_0^{t-1}\ldots x_{N-1}^{t-1}$ that are to be found from the observed transitions. $g_i$ and $h_i$ indicate when a state transition is known. $g_i$ indicates when variable i takes on a 0 value, and $h_i$ indicates when variable i takes on a 1 value. When $f_i$ evaluates to u, the transition for the given input state is unknown. More formally, $$g_i(\vec{x})=1 \to x_i^t=0 \text{ when } \vec{x}^{t-1}=\vec{x}$$
$$h_i(\vec{x})=1 \to x_i^t=1 \text{ when } \vec{x}^{t-1}=\vec{x} \qquad (7)$$

Having two functions allows storing separately information on the known transitions to 0 and 1 without having to represent the information on all possible transitions in a single function, thereby greatly lessening the storage required to solve the inverse problem.

The manner in which $g_i$ and $h_i$ are assigned is most easily shown by example. Consider the transitions shown in FIG. 2. At t=1, sites $x_0$ and $x_1$ are 0. Thus, functions $g_0$ and $g_1$ must evaluate to 1 when $\vec{x}=000$. Site $x_2$ is 1, so function $h_2$ must evaluate to 1 for the same $\vec{x}$. Thus, from the 000→001 transition, we can set $$g_0 = \bar{x}_0\bar{x}_1\bar{x}_2 \quad h_0 = 0 \qquad (8)$$
$$g_1 = \bar{x}_0\bar{x}_1\bar{x}_2 \quad h_1 = 0$$
$$g_2 = 0 \qquad h_2 = \bar{x}_0\bar{x}_1\bar{x}_2$$

The next transition is 001→011, so all three h functions are updated as follows:

$$g_0 = \bar{x}_0\bar{x}_1\bar{x}_2 + \bar{x}_0\bar{x}_1 x_2 \quad h_0 = 0 \qquad (9)$$
$$g_1 = \bar{x}_0\bar{x}_1\bar{x}_2 \qquad h_1 = \bar{x}_0\bar{x}_1 x_2$$
$$g_2 = 0 \qquad h_2 = \bar{x}_0\bar{x}_1\bar{x}_2 + \bar{x}_0\bar{x}_1 x_2$$

If this process were continued, storing the $g_i$ and $h_i$ would occupy even more memory than the q's. However, after including the data from each transition, many of the $g_i$ and $h_i$ can be simplified using the rules of Boolean logic, thereby compacting the expressions and removing unnecessary variables. In this case, both $g_0$ and $h_2$ are simplified to $\bar{x}_0\bar{x}_1$. The next transition is 011→111, resulting in $g_i$ and $h_i$ functions $$g_0 = \bar{x}_0\bar{x}_1 \qquad h_0 = \bar{x}_0 x_1 x_2 \qquad (10)$$
$$g_1 = \bar{x}_0\bar{x}_1\bar{x}_2 \quad h_1 = \bar{x}_0 x_2$$
$$g_2 = 0 \qquad h_2 = \bar{x}_0\bar{x}_1 + \bar{x}_0 x_1 x_2$$

Repeating this process through all observed transitions will build up more and more complete network functions.

Note that $g_i$ and $h_i$ will never both be 1 for the same $\vec{x}$ state in this Boolean GRN model based on noiseless observations of a deterministic Boolean GRN.

For an arbitrary set of n observed transitions $T=\{\vec{x}^j \to \vec{y}^j, j=1\ldots n\}$, the $g_i$ and $h_i$ functions are calculated:

$$g_i = \bigvee_{j\in G_i} \bigwedge_{k=0}^{N-1} NOT^{x_k^j}(x_k^j) \qquad (11)$$

$$h_i = \bigvee_{j\in H_i} \bigwedge_{k=0}^{N-1} NOT^{x_k^j}(x_k^j)$$

where $G_i=j, 1\leq j\leq n: y_i^j=0$ $H_i=j, 1\leq j\leq n: y_i^j=1$

Note that the argument of $NOT^W(x)$ is the variable x and the superscript is the actual value of variable w in the observed transitions. $G_i$ and $H_i$ are the indices of those states that lead to variable $x_i$ becoming a 0 or 1 respectively. The sums in Eqn. 11 are the logical OR of the states within these sets. To reduce storage requirements, the expressions should be simplified between each term in the OR. By first sorting the transition expressions by input states $\vec{x}^y_j$, successive terms on the growing $g_i$ and $h_i$ expressions will tend to be similar and will lengthen more slowly than for an arbitrary order. Alternatively, the list of transitions can be expressed in programmable logic array (PLA) format such as the Berkeley standard format and then simplified. As is known to persons of ordinary skill in the art, there are a number of available freeware programs which perform Boolean logic simplification using this input format. See R. Brayton, G. Hachtel, C. McMullen, and A. Sangiovanni-Vincentelli, *Logic Minimization Algorithms for VLSI Synthesis*, Kluwer Academic Publishers, 1984; R. Rudell and A. Sangiovanni-Vincentelli, Espresso-MV. Algorithms for multiple-valued logic minimization, *Proc. Cust. Int. Circ. Conf.*, May 1985, A. Sangiovanni-Vincentelli R. Rudell, Exact minimization of multiple-valued functions for PLA minimization, Int. Conf. Comp. Aid. Des., November 1986.

If all transitions are observed, then the functions will be complete, and $g=\bar{h}_i$ so $f_i \neq u$ for all i. If not all transitions are observed, as will almost always be the case, $f_i$ will evaluate to u for some input states, indicating that the transition is unknown. The knowledge of which transitions remain unknown is important, as it allows using a carefully considered approach towards dealing with these cases. Depending on the application, a successor state can be selected at random or a maximum entropy approach can be taken allowing any state to be selected as a successor with uniform probability.

The $Q_i$ and $g_i/h_i$ representations are easily exchanged. Finding $g_i$ and $h_i$ from $Q_i$ is little different than finding $g_i$ and $h_i$ from transitions.

$$g_i = \bigvee_{\vec{w} \in Z^N} \delta(q_i^{\vec{w}}, 0) \bigwedge_{k=0}^{N-1} NOT_k^j(x_k^j) \qquad (12)$$

$$h_i = \bigvee_{\vec{w} \in Z^N} \delta(q_i^{\vec{w}}, 1) \bigwedge_{k=0}^{N-1} NOT_k^j(x_k^j)$$

where $\delta(a,b)$ is the Kronecker delta function ($\delta(a,b)=1$ for $a=b$ and 0 otherwise). The delta function serves to only include the appropriate $\vec{w}$ values in the OR as well as to remove the unknown $q_i^{\vec{w}}$ values from the OR. Conversion for $g_i$ and $h_i$ to $q_i^{\vec{w}}$ is also straightforward $$q_i^{\vec{w}} = \begin{cases} 0: & g_i(\vec{w}) = 1 \\ 1: & h_i(\vec{w}) = 1 \\ u: & \text{otherwise} \end{cases} \qquad (13)$$

Like the first embodiment, a second embodiment of the present invention presents a method to create a synchronous, deterministic network model of a GRN from a plurality of noiseless observed system state transitions. However, in the second embodiment of the present invention, each of the N Boolean variables has many possible values instead of the two possible values of the first embodiment. For example, site $x_i$ might have 3 values, each assigned using multilevel logic.

This multilevel logic feature in the second embodiment represents an advantage over the first embodiment of the present invention. For example, genes are expressed to different degrees and their protein and mRNA products vary over a wide range of concentrations. The multilevel logic feature enables the second embodiment to more accurately represent the expression of the genes in the GRN because it supports multiple levels of state activation. Thus, the second embodiment of the present invention represents an improvement over the first embodiment because it more closely approximates actual GRNs.

The present invention easily extends to the multilevel logic case by defining $f_i$ as $$f_i = \begin{cases} v_0: & g_i^{v_0} = 1 \\ v_1: & g_i^{v_1} = 1 \\ & \vdots \\ v_{m-1}: & g_{m-1}^{v_{m-1}} = 1 \\ u: & \text{otherwise} \end{cases} \qquad (14)$$

where there are m logic levels $v_0 \ldots v_{m-1}$ and function $g_i^{v_j}$ is 1 when variable $x_i$ evaluates to value $v_j$. Other than the increased number of component functions of $f_i$ that have to be evaluated and the greater complexity of simplifying multilevel logic expressions, the solution to the multilevel logic inverse problem is identical to the solution to the boolean inverse problem.

A third embodiment of the present invention extends the basic model of the first two embodiments while retaining the Boolean or multilevel logic nature of the functions and synchronous updating by making the network functions Markovian of order greater than 1. Specifically, $f_i$ will depend not just on $\vec{x}^{t-1}$ but on $\vec{x}$ over T previous time steps.

$$f_i = f_i(\vec{x}^{t-1}, \vec{x}^{t-2}, \vec{x}^{t-T}) \qquad (15)$$

Written in this fashion, $f_i$ is potentially a function of NT Boolean variables. Using the q notation from Eqn. 3

$$f_i(\vec{x}^{t-1}, \vec{x}^{t-2}, \ldots, \vec{x}^{t-T}) = \bigvee_{\vec{w} \in Z^N} q_i^{\vec{y}} \bigwedge_{\tau=t-T}^{t-1} \bigwedge_{k=0}^{N-1} NOT_k^{y_k}(x_k^\tau) \qquad (16)$$

The q variables have a meaning similar to that used above, only they are now superscripted with concatenation of input values for the last T time steps. As an example in the Boolean case, for N=2 and T=2, $f_i$ can be represented as $$\begin{aligned} f_i(\vec{x}^t) = &\, q_i^{0000} \bar{x}_0^{t-1} \bar{x}_1^{t-1} \bar{x}_0^{t-2} \bar{x}_1^{t-2} + q_i^{0001} \bar{x}_0^{t-1} \bar{x}_1^{t-1} \bar{x}_0^{t-2} x_1^t \\ &+ q_i^{0010} \bar{x}_0^{t-1} \bar{x}_1^{t-1} x_0^{t-2} \bar{x}_1^{t-2} + q_i^{0011} \bar{x}_0^{t-1} \bar{x}_1^{t-1} x_0^{t-2} x_1^t \\ &+ q_i^{0100} \bar{x}_0^{t-1} x_1^{t-1} \bar{x}_0^{t-2} \bar{x}_1^{t-2} + q_i^{0101} \bar{x}_0^{t-1} x_1^{t-1} \bar{x}_0^{t-2} x_1^t \\ &+ q_i^{0110} \bar{x}_0^{t-1} x_1^{t-1} x_0^{t-2} \bar{x}_1^{t-2} + q_i^{0111} \bar{x}_0^{t-1} x_1^{t-1} x_0^{t-2} x_1^t \\ &+ q_i^{1000} x_0^{t-1} \bar{x}_1^{t-1} \bar{x}_0^{t-2} \bar{x}_1^{t-2} + q_i^{1001} x_0^{t-1} \bar{x}_1^{t-1} \bar{x}_0^{t-2} x_1^t \\ &+ q_i^{1010} x_0^{t-1} \bar{x}_1^{t-1} x_0^{t-2} \bar{x}_1^{t-2} + q_i^{1011} x_0^{t-1} \bar{x}_1^{t-1} x_0^{t-2} x_1^t \\ &+ q_i^{1100} x_0^{t-1} x_1^{t-1} \bar{x}_0^{t-2} \bar{x}_1^{t-2} + q_i^{1101} x_0^{t-1} x_1^{t-1} \bar{x}_0^{t-2} x_1^t \\ &+ q_i^{1110} x_0^{t-1} x_1^{t-1} x_0^{t-2} \bar{x}_1^{t-2} + q_i^{1111} x_0^{t-1} x_1^{t-1} x_0^{t-2} x_1^t \end{aligned} \qquad (17)$$

The inverse problem is to find all $TN2^N$ Boolean $q_i^y$'s.

By having network functions with Markovian order greater than one, the third embodiment of the present invention has an advantage over the first two embodiments. The basic models of the first two embodiments assume that the direct influence of a gene only occurs in the next time step. Thus, the models are completely 1st-order Markovian. However, when biological genes are activated, their effect will generally rise gradually and plateau, as the concentration of the expressed protein increases and plateaus. This influence may also wane with time if the expressed proteins are degraded or cleared from the cell. In addition, the influence of different sites or system states on a given gene may also occur after different lag times, and the lags for activation and inactivation of a gene are generally different. Accordingly, having network function with Markovian order greater than one enables the third embodiment to more accurately represent the time-dependent expression of genes in the GRN.

Like the 1st-order Markovian models of the first two embodiments, the third embodiment also separately stores information on the known transitions to each of the m logic levels without having to represent the information on all possible transitions in a single function. This representation serves to greatly lessen the storage required for representing the partial knowledge of all $TN2^N$ Boolean $q_i^y$'s. $f_i$ is still defined as in Eqn. 6, but $g_i$ and $h_i$ are now functions of $x_k^\tau$, $k=0 \ldots N-1, \tau=t-T \ldots t-1$. For a set of n observed transition series each over T transitions, $$\vec{x}^{t-T,1} \to \vec{x}^{t-T+1,1} \to \ldots \to \vec{x}^{t,1},$$

$$\vec{x}^{t-T,2} \to \vec{x}^{t-T+1,2} \to \ldots \to \vec{x}^{t,2},$$

$$\vdots$$

$$\vec{x}^{t-T,n} \to \vec{x}^{t-T+1,n} \to \ldots \to \vec{x}^{t,n}$$

the $g_i$ and $h_i$ functions are calculated as $$g_i = \bigvee_{j \in G_i} \bigwedge_{\tau=t-T}^{t-1} \bigwedge_{k=0}^{N-1} NOT_k^{\tau,j}(x_k^{\tau,j}) \quad (18)$$

$$h_i = \bigvee_{j \in H_i} \bigwedge_{\tau=t-T}^{t-1} \bigwedge_{k=0}^{N-1} NOT_k^{\tau,j}(x_k^{\tau,j})$$

where $$G_i = \{j, 1 \leq j \leq n: x_i^{t,j} = 0\}$$

$$H_i = \{j, 1 \leq j \leq n: x_i^{t,j} = 1\}$$

Again, note that the argument of the NOT function refers to the variable and the superscript to the value of the variable. $G_i$ and $H_i$ are the indices of those sets of state transitions that lead to variable $x_i^t$ becoming a 0 or 1 respectively. The $\wedge$s in Eqn. 18 are the logical AND of all NT variables or their compliments. These terms are then ORed together by the $\vee$. As in the first two embodiments, to reduce storage requirements, the expressions can be simplified between each term in the OR expressed in PLA format.

If all state transitions are observed, then the functions of the first three embodiments of the present invention will be complete, and $$g_i = \overline{h_i},$$

so $f_i \neq u$ for all i. If not all state transitions are observed, as will almost always be the case, $f_i$ may evaluate to u for some input states, indicating that the transition is unknown.

The present invention employs different alternatives to create a network model of a GRN when all of the state transitions are not observed. First, a successor state of an unknown state transition can be selected at random. Alternatively, a maximum entropy approach can be taken allowing any state to be selected as a successor with uniform probability.

Even if all possible state transitions are observed, lengthy network functions could be produced. For example biological genetic networks frequently have lengthy network functions because of the slow degradation of gene products such as mRNAs and proteins. To illustrate this problem, FIG. 4 displays a table of observed state transitions for a synchronous, GRN having a Markovian order of at least three and having N=3 Boolean variables. FIG. 4 shows a pattern of activation and deactivation states repeated many times in the observed transitions. The -'s indicate that different values were observed for those genes at those times. Here, gene 0 produces a protein that activates gene 1 three time steps later. Because the protein is not immediately degraded, gene 1 stays active for several time steps, even if gene 0 was only active briefly. Accordingly, the algorithm of the first three embodiments will find no single pattern of activation and deactivation in the last T time steps that accounts for the activation state of gene 1. Instead, these embodiments will OR together many different gene activation patterns consistent with the observed data. In this example, if there is no other consistent pattern for the activation or deactivation of gene i, the possible resulting network function for $x_1$ is $$x_1^t = f_1(\vec{x}^{t-1}, \ldots, \vec{x}^{t-T}) =$$
$$x_0^{t-3} \vee (x_0^{t-4} x_1^{t-1}) \vee (x_0^{t-5} x_1^{t-1} x_1^{t-2}) \quad (19)$$

In general, if activation state y induces gene $x_i$ to activate $t_1$ time steps later and stay active for $t_2$ time steps, the activating network function ($h_i$) that results from observing all transitions may be of the form $$h_i^t = \vee^{\vec{y}}(\vec{x}^{t-t_1}) \vee [\nu^{\vec{y}}(\vec{x}^{t-(t_1+1)}) x_i^{t-1}] \vee \ldots$$
$$\vee [\nu^{\vec{y}}(\vec{x}^{t-t_2}) x_i^{t-1} x_i^{t-2} \ldots x_i^{t-(t_2-1)}] \quad (20)$$

where $$\nu^{\vec{y}}(\vec{x}) = \bigwedge_{k=0}^{N-1} NOT^{y_k}(x_k) \quad (21)$$

Other forms for the network functions are possible, but they all are similar in general form to Eqn. 21. Similar issues apply to the inactivating network functions $g_i$.

When applying this method to biological data, such a concatenation of OR'd terms indicate that gene products are involved. The longer the gene product remains capable of affecting gene i, the larger the number of terms. While this third embodiment has been described for the Boolean case, it can be applied to multilevel logic as described in the second embodiment by replacing $g_i$ and $h_i$ functions with $g_i^{v_j}$ functions, $j=1 \ldots m$ for m logic levels, $V_1 \ldots V_m$.

The approaches described above are similar to a Bayesian inference method starting with a uniform prior distribution over all network functions. In a fourth embodiment of the present invention, the method starts with prior knowledge of the likeliness of different network functions and expresses them in a prior probability distribution $p(f_i)$ (prior). Using the observed transitions, a likelihood function modifies the prior probability distribution $p(f_i)$ into a posterior probability distribution. The posterior probability distribution indicates the probabilities of the different possible network functions given the observed transition data. Notationally, $$p(f_i|T;\zeta) = c \, p(T|f_i,\zeta) p(f_i|\zeta) \quad (22)$$

where c is a constant necessary to give normalized probabilities, $T = \{\vec{x}^j \to \vec{y}^j, j=1 \ldots n\}$ is the set of observed state transitions and $\zeta$ refers to any additional information that the calculations may be conditioned upon.

The fourth embodiment of the present invention uses different alternatives to represent the prior probability distributions of the N sites of the network model. Prior probability distributions are potentially very useful because they can lead to more rapid convergence of the posterior probability distribution. For notational simplicity, the same prior distribution will be used for each site, and the priors for different sites will be considered independent. For modeling biological GRNs, different prior distributions can be used for different sites to take advantage of better knowing the prior probability distribution for particular genes (similarly for other GRN applications). In a first alternative, the prior probability distributions of the N sites are independent and identical. In a second alternative, the prior probability distributions are dependent on some subset or all of the N sites.

With a uniform prior probability distribution, for the Boolean case, since there are $2^{2^N}$ possible network functions, $p(f_i|\zeta)=2^{-2^N}$. For the multilevel logic case, $p(f_i|\zeta)=m^{-m^N}$. With deterministic network rules and no noise in the observations, the likelihood function for transition j, ($\vec{x}^j \to \vec{y}^j$), is $$p(\vec{x}^j \to \vec{y}^j \mid Q, \zeta) = \prod_{i=0}^{N-1} \delta(q_i^{\vec{x}^j}, y_i^j) \quad (23)$$

where the network function $f_i$ has been replaced with its definition in terms of Q. For a 1st order Markovian network model, the separate transitions can be considered independent of one another, since a given state will always transition to the same successor state no matter what states preceded it. Thus, the likelihood function for the set of transitions T is the product of the likelihoods for the individual transitions $$p(T \mid Q, \zeta) = \prod_{j=1}^{n} p(\vec{x}^j \to \vec{y}^j \mid Q, \zeta) = \prod_{j=1}^{n} \prod_{i=0}^{N-1} \delta(q_i^{\vec{x}^j}, y_i^j) \quad (24)$$

Since the likelihood function in Eqn. 22 is of such simple form with a uniform prior probability distribution, there was no need to use the formal Bayesian notation in the first three embodiments. Instead, the principal difficulty was the efficient representation of the posteriorprobability distribution, which was done with the $g_i$ and $h_i$ functions as previously discussed. With a non-uniform prior probability distribution, however, and particularly when dealing with noise as subsequently discussed, it is important to use the Bayesian formalism. Once a prior probability distribution is defined, for each site i, the network function most compatible with the data is the one with the highest value in Eqn. 22.

The fourth embodiment of the present invention represents a non-uniform prior probability distribution for $f_i$ based on probabilities of a few abstract properties of the network functions. This is important as simply listing the probabilities for each of the $2^{2^N}$ possible Boolean network functions would require an unreasonable amount of memory. The present invention calculates the abstract properties directly from the network functions. This scheme allows the priorprobability distributions to be calculated as they are needed instead of storing all the priorprobability distributions in memory. Preferably, the present invention uses the following three abstract properties: $K_i$, $C_i$ and $P_i$. See Harris et al. and Kauffman. $K_i(0 \leq K_i \leq N)$ is the number of inputs to site i, which corresponds to the number of site variables that have a non-negligible influence on $f_i$. $C_i(0 \leq C_i \leq N-1)$ is the number of canalizing inputs, the number of variables for which one value of that variable completely determines the output of $f_i$. $P_i(0.5 \leq K_i \leq 1)$ is the fraction of outputs of $f_i$ that have the same value. FIG. 5 shows the values of these abstract properties for all 16 possible functions of N=2 Boolean variables.

The present invention decomposes a prior distribution based on these three properties, $p(P_i, C_i, K_i)$. Preferably, the decomposition is $$p(P_i, C_i, K_i) = p(P_i|C_i, K_i)p(C_i|K_i)p(K_i). \quad (25)$$

$p(K)$ is the distribution for the number of inputs. $p(C|K)$ is the number of canalizing inputs for a given number of inputs. As suggested by collected data (See Harris et al.), the observed degree of canalization in human genes seems to vary strongly with the number of inputs. $p(P|C,K)$ is the number of identical outputs for a given number of inputs and degree of canalization. However, it is apparent to persons of ordinary skill in the art that the properties could be decomposed in several other manners. For example, an alternate decomposition is $p(P_i, C_i, K_i)=p(P_i|C_i, K_i)p(K_i|C_i)p(C_i)$. A second alternate decomposition is: $p(P_i, C_i, K_i)=p(K_i|C_i, P_i)p(C_i|P_i)p(P_i)$.

The present invention defines probability distributions for the abstract properties using different alternatives. In a first alternative, the present invention assigns probability distributions to the abstract properties based on intuition. In a preferred second alternative, the present invention assigns probability distributions to the abstract properties by canvassing the literature.

The following example illustrates the method of the fourth embodiment of the present invention for creating a Boolean network model of a GRN from a plurality of observed system state transitions. For N=2, let the prior probability distribution be:

$$p(f_i(\vec{x}), \zeta) = \quad (26)$$

$$\begin{cases}
0: & f_i(\vec{x}) = 0, & q_i^{00} = 0, q_i^{01} = 0, q_i^{10} = 0, q_i^{11} = 0 \\
0: & f_i(\vec{x}) = 1, & q_i^{00} = 1, q_i^{01} = 1, q_i^{10} = 1, q_i^{11} = 1 \\
0.1875: & f_i(\vec{x}) = x_0, & q_i^{00} = 0, q_i^{01} = 0, q_i^{10} = 1, q_i^{11} = 1 \\
0.1875: & f_i(\vec{x}) = \vec{x}_0, & q_i^{00} = 1, q_i^{01} = 1, q_i^{10} = 0, q_i^{11} = 0 \\
0.1875: & f_i(\vec{x}) = x_1, & q_i^{00} = 0, q_i^{01} = 1, q_i^{10} = 0, q_i^{11} = 1 \\
0.1875: & f_i(\vec{x}) = x_0, & q_i^{00} = 1, q_i^{01} = 0, q_i^{10} = 1, q_i^{11} = 0 \\
0.0125: & f_i(\vec{x}) = \vec{x}_0 x_1 + x_0 \vec{x}_1, & q_i^{00} = 0, q_i^{01} = 1, q_i^{10} = 1, q_i^{11} = 0 \\
0.0125: & f_i(\vec{x}) = \vec{x}_0 x_1 + x_0 \vec{x}_1, & q_i^{00} = 1, q_i^{01} = 0, q_i^{10} = 0, q_i^{11} = 1 \\
0.0281: & f_i(\vec{x}) = x_0 x_1 & q_i^{00} = 0, q_i^{01} = 0, q_i^{10} = 0, q_i^{11} = 1 \\
0.0281: & f_i(\vec{x}) = x_0 x_1 & q_i^{00} = 0, q_i^{01} = 0, q_i^{10} = 0, q_i^{11} = 1 \\
0.0281: & f_i(\vec{x}) = x_0 \vec{x}_1 & q_i^{00} = 0, q_i^{01} = 0, q_i^{10} = 1, q_i^{11} = 0 \\
0.0281: & f_i(\vec{x}) = \vec{x}_0 x_1 & q_i^{00} = 0, q_i^{01} = 1, q_i^{10} = 0, q_i^{11} = 0 \\
0.0281: & f_i(\vec{x}) = \vec{x}_0 \vec{x}_1 & q_i^{00} = 1, q_i^{01} = 0, q_i^{10} = 0, q_i^{11} = 0 \\
0.0281: & f_i(\vec{x}) = x_0 - x_1 & q_i^{00} = 0, q_i^{01} = 1, q_i^{10} = 1, q_i^{11} = 1 \\
0.0281: & f_i(\vec{x}) = x_0 - \vec{x}_1 & q_i^{00} = 1, q_i^{01} = 0, q_i^{10} = 1, q_i^{11} = 1 \\
0.0281: & f_i(\vec{x}) = \vec{x}_0 - x_1 & q_i^{00} = 1, q_i^{01} = 1, q_i^{10} = 0, q_i^{11} = 1 \\
0.0281: & f_i(\vec{x}) = x_0 - x_1 & q_i^{00} = 1, q_i^{01} = 1, q_i^{10} = 1, q_i^{11} = 0
\end{cases}$$

for i=0,1. This prior probability distribution is based on the probability distributions of the abstract properties:

$$p(K) = \begin{cases} 0.00: & K = 0 \\ 0.75: & K = 1 \\ 0.25: & K = 2 \end{cases} \quad (27)$$

$p(C=0|K=2)=0.1$, and $p(C=1|K=2)=0.9$. Because N is only 2 in this example, there is insufficient variation in functions to require a P distribution.

Let the observed transitions be T={00→01,01→11}. The likelihood functions can then be written $$p_{x_0}(T|Q_1, \zeta) = \delta(q_0^{00}, 1)\delta(q_0^{01}, 1) \quad (28)$$

$$p_{x_1}(T|Q_1, \zeta) = \delta(q_1^{00}, 1)\delta(q_1^{01}, 1)$$

where the collective likelihood function from Eqn. 24 has been split into separate functions for each Boolean variable.

FIG. 5 illustrates the prior, likelihood, and posterior distributions over all possible Boolean functions for this example. Because there is no noise, the likelihood functions allow only one possible transition from each predecessor state. Accordingly, the likelihood functions have values of either 0 or 1. The posterior probability distributions have been normalized to total to 1. The maximum posterior network functions are $f_0=x_1$, and $f_1=\vec{x}_0$. Thus, these are the best possible solutions given the prior knowledge and the observed transitions.

As illustrated by FIG. 5 and the example described above, the ability to create genetic regulatory network models using a non-uniform prior probability distribution gives the present invention an important advantage. Specifically, if the prior probability distribution is reasonably correct and narrow, the method of creating a network model will quickly converge towards a single or a small range of network functions whether based on Boolean or multilevel logic. In the example described above, four Boolean functions would have a probability of 0.25 with a uniform prior probability distribution. Accordingly, no Boolean function would stand out as being the most probable. With a non-uniform prior probability distribution, one function stands out as being much more probable for both sites. Since it is not possible to observe transitions from every state when dealing with GRNs encountered in real situations, this improved convergence to a solution exhibited by the present invention for non-uniform probability distribution is an important advantage. The approaches for the solution of the inverse GRN problem with a non-uniform prior distribution can be extended in a straight-forward manner to support multilevel logic and/or extended time.

One concern that often arises in studying genetic regulatory networks is the ability to distinguish causal and associative relationships. Using a prior distribution lessens this problem. To illustrate this concern, FIG. 6 displays a table of observed state transitions for a synchronous GRN having $N=3$ variables and a Markovian order which is at least four and can be as high as six. In FIG. 6, the time is shown relative to time $\tau$. The -'s indicate that, over multiple observations of transitions with the patterns of 0's and 1's as shown, different values were observed for that gene at that time. If gene $x_2$ is consistently active (equal to 1) at the time $t=\tau$ when $x_0=1$ at time $t=\tau-6$ and gene $x_1=1$ at time $t=\tau-4$, it is not clear whether $x_0$ is activating both $x_1$ and $x_2$ (associative relationship between $x_1$ and $x_2$) or whether $x_0$ activates $x_1$ and $x_1$ in turn activates $x_2$ (causal relationship between $x_1$ and $x_2$). In fact, if the data always shows these three genes active in this temporal pattern, there is no means to distinguish these hypotheses. However, if there are transition series observed in which this pattern is broken; for example, $x_0^{\tau-6}=0$ and $x_1^{\tau-4}=1$, then the algorithm can distinguish the hypotheses. If $x_2^{\tau}=0$ concludes this series, then it is an associative relationship and $x_0=1$ activates $x_2$ 6 time steps later. Clearly another gene must be influencing $x_2$ in this case. If $x_2^{\tau}=1$ concludes this series, then it is a causal relationship and $x_1=1$ activates $x_2$ 4 time steps later.

Using a prior probability distribution provides a bias that helps choose between alternative hypotheses that are indistinguishable from the observed data. In other words, the use of a prior probability distribution helps to determine whether apparent causal relationships are actually associative. If the observed data suggest causal network functions that have very low probability in the prior probability distribution, then the observed causal relationship is suspect.

A fifth embodiment of the present invention presents a method to create a synchronous, deterministic Boolean or multilevel logic network model of a genetic regulatory network (GRN) from a plurality of noisy observed system state transitions. The approaches of the first four embodiments of the present invention assume observation of the state transitions is without noise. However, gene expression level data is very noisy since it is based on stochastic processes and experimental techniques. Accordingly, by accounting for noise in the observation of the state transitions, the fifth embodiment of the present invention avoids creating contradictory or erroneous $g_i$ and $h_i$ or $q_i^x$'s.

The fifth embodiment of the present invention extends the Bayesian approach to accommodate noisy observations by changing the likelihood function. For example, let $p_0$ be the probability that an observed 0 is correct and $p_1$ be the probability that an observed 1 is correct for a GRN with two logic levels. Define $\vec{x} \to \vec{y}$ as a single observed noisy transition. The likelihood function for one site i can be expressed $$p(\vec{x} \to y_i \mid Q_i, \zeta) = \sum_{\vec{w} \in Z^N} \sum_{z_i \in Z} p(\vec{x} \to y_i \mid \vec{w} \to z_i, Q_i, \zeta) p(\vec{w} \to z_i \mid Q_i, \zeta) \quad (29)$$

where the sums are over all possible true transitions $\vec{w} \to z_i$. The two terms in Eqn. 29 can be found as follows: $p(\vec{w} \to z_i \mid Q_i, \zeta) = \delta(q_i^{\vec{w}}, z_i)$, as this probability is identical to the likelihood function for the noiseless case.

$$p(\vec{x} \to y_i \mid \vec{w} \to z_i, Q_i, \zeta) = p(\vec{x} \to y_i \mid \vec{w} \to z_i) \quad (30)$$

$$= h(z_i, y_i) \prod_{k=0}^{N-1} h(w_k, x_k)$$

where $h(a, b)$ accounts for the probability of changes in site values and is defined as:

$$h(a, b) = \begin{cases} p_0: & a=0, b=0 \\ p_1: & a=1, b=1 \\ 1-p_1: & a=0, b=1 \\ 1-p_0: & a=1, b=0 \end{cases} \quad (31)$$

Thus, $$p(\vec{x} \to y_i \mid Q_i, \zeta) = \sum_{\vec{w} \in Z^N} \sum_{z_i \in Z} \delta(q_i^{\vec{w}}, z_i) h(z_i, y_i) \prod_{k=0}^{n-1} h(w_k, x_k) \quad (32)$$

$$= \sum_{\vec{w} \in Z^N} h(q_i^{\vec{w}}, y_i) \prod_{k=0}^{n-1} h(w_k, x_k)$$

The likelihood function for one site given all the observed transitions is the product of the probabilities of the individual transitions, as in Eqn. 24. With $T=\{\vec{x}^j \to \vec{y}^j, j=1 \ldots n\}$ defined as the observed transitions, $$p_{x_i}(T \mid Q_i, \zeta) = \prod_{j=1}^{n} \sum_{\vec{w} \in Z^N} h(q_i^{\vec{w}}, y_i^j) \prod_{k=0}^{n-1} h(w_k, x_k^j) \quad (33)$$

The likelihood function for all sites collectively is the product of the likelihood function for each site independently since the Boolean functions for each site are independent. Thus, the collective likelihood function is:

$$p(T \mid Q, \zeta) = \prod_{j=1}^{n} \prod_{i=0}^{N-1} p(\vec{x}^j \to y_i^j \mid Q_i, \zeta) \qquad (34)$$

$$= \prod_{j=1}^{n} \sum_{\vec{w} \in Z^N} \left( \prod_{i=0}^{N-1} h(q_i^{\vec{w}}, y_i^j) \right) \left( \prod_{k=0}^{N-1} h(w_k, x_k^j) \right)$$

The product over k of Eqn. 34 is the probability that input state $\vec{x}$ would have been observed given that the actual input state was $\vec{w}$. The product over i is the probability that the output state $\vec{y}$ would have been observed given actual input state $\vec{w}$. The sum over $\vec{w}$ adds the product of these probabilities over all possible inputs, and the product over j repeats this sum for all observed transitions. The required computation for Eqn. 34 can be greatly decreased if the sum over the real input states $\vec{w}$ is limited to those input states $\vec{w}$ which have a non-negligible probability of being observed as $\vec{x}^j$. For example, if $P_0 = p_1 = 0.95$ and $N=100$ the probability of observing any x which differs from a $\vec{w}$ in 30 or more sites is $1 \times 10^{-8}$. Accordingly, the fifth embodiment of the present invention removes these $\vec{w}$'s from the sum with little loss in accuracy.

While the example discussed immediately above illustrated the simple case where each site had a fixed probability of being observed incorrectly for an observed 0 and 1, the fifth embodiment of the present invention can use any probabilistic mapping $p(\vec{x} \to y_i \mid \vec{w} \to z_i, Q_i, \zeta)$ between true and observed transitions in the likelihood function.

The following example illustrates the method of the fifth embodiment of the present invention for creating a Boolean network model of a GRN from a plurality of observed system state transitions with noise. Let the prior probability distribution for N=2 be the same as the prior probability distribution in the earlier example. For $p_0=0.9$ and $p_1=0.8$, the likelihood function for site 0 and observed transitions $T=\{00 \to 01, 01 \to 11\}$ is $$p_{x_0}(T \mid Q_0, \zeta) = \prod_{j=1}^{2} \sum_{\vec{w} \in Z^2} h(q_0^{\vec{w}}, y_0^j) \prod_{k=0}^{1} h(w_k, x_k^j) \qquad (35)$$

$$= [h(q_0^{00}, y_0^1)(p_0)^2 + h(q_0^{01}, y_0^1)p_0(1-p_0) +$$

$$h(q_0^{10}, y_0^1)(1-p_0)p_0 + h(q_0^{11}, y_0^1)(1-p_0)^2] *$$

$$[h(q_0^{00}, y_0^2)p_0(1-p_1) + h(q_0^{01}, y_0^2)p_0 p_1 +$$

$$h(q_0^{10}, y_0^2)(1-p_0)(1-p_1) +$$

$$h(q_0^{11}, y_0^2)(1-p_0)p_1]$$

$$= [h(q_0^{00}, y_0^1)0.81 + h(q_0^{01}, y_0^1)0.09 +$$

$$h(q_0^{10}, y_0^1)0.09 + h(q_0^{11}, y_0^1)0.01] *$$

$$[h(q_0^{00}, y_0^2)0.18 + h(q_0^{01}, y_0^2)0.72 +$$

$$h(q_0^{10}, y_0^2)0.02 + h(q_0^{11}, y_0^2)0.08]$$

FIG. 7 illustrates the prior, likelihood and posterior distributions for this example. The posterior probability distributions have been normalized. Compared to the results for the noiseless case of the preceding example, the likelihood probabilities are spread throughout the 16 possible functions for both sites. The maximum posterior network functions are $f_0(\vec{x}) = x_1$ and $f_1(\vec{x}) = \bar{x}_0$. These functions are the same functions which had the maximum posterior probability distributions in the noiseless case. However, the probabilities that these functions are correct are significantly less than the corresponding probabilities for the noiseless case.

The Bayesian approach to noisy data can be combined with the extended time problem to find the probability of network rules Q of Markovian order M>1, as defined in the description of the third embodiment of the invention given a set of observed transition series T. T is defined as the set of n observed transition series, $T_j$ is defined as the j'th observed transition series, S is defined as the set of n actual transition series and $S_j$ is defined as the j'th actual transition series. These series are related by:

$$T = \{T_j, j=1 \ldots n\}$$

$$T_j = \{\vec{x}^{t-Tj} \to \vec{x}^{t-T+1j} \to \ldots \to \vec{x}^{tj}\}$$

$$S = \{S_j, j=1 \ldots n\}$$

$$S_j = \{\vec{s}^{t-Tj} \to \vec{s}^{t-T+1j} \to \ldots \to \vec{s}^{tj}\}$$

where $\vec{s}^{tj}$ is the vector of actual values for the N variable at time t in transition series j. The M-order network functions are defined as $Q = \{Q_i, i=0 \ldots N-1\}$ where the individual network rules are defined as $Q_i = \{q_i^{\vec{y}}, \vec{y} \in Z^{NM}\}$, and where $\vec{y}$ is the concatenation of input values for the last M time steps; i.e., $$\vec{y} = [x_0^{t-1}, x_1^{t-1}, \ldots, x_{N-1}^{t-1}, x_0^{t-2}, x_1^{t-2}, \ldots, x_{N-1}^{t-2}, \ldots, x_0^{t-M},$$

$$x_1^{t-M}, \ldots, x_{N-1}^{t-M}].$$

Preferably, the probability that the transition series $T_j$ was observed given actual transition series $S_j$ is given by $$p(T_j \mid S_j) = \prod_{\tau = t-T}^{t} \prod_{k=0}^{N-1} h(x_k^\tau, s_k^\tau)$$

where h(a, b) accounts for the probability of a noise-induced change in site values from a to b and is defined as:

$$h(a, b) = \begin{cases} p_0: & a=0, b=0 \\ p_1: & a=1, b=1 \\ 1-p_1: & a=0, b=1 \\ 1-p_0: & a=1, b=0 \end{cases}$$

where $p_0$ is the probability that an observed 0 is correct, and $p_1$ is the probability that an observed 1 is correct. As is known by persons of ordinary skill in the art, alternate probabilistic models for the observation and measurement of noise could be substituted as the remainder of the derivation does not depend on the specific form of $p(S_j \mid T_j)$.

Using Bayes' rule, the network rule probabilities are given by:

$$p(Q \mid T) \; p(T \mid Q, \zeta) p(Q \mid \zeta)$$

where p(Q) is the prior probability of the network rule Q. Preferably, p(Q) is defined using abstract properties of network functions as previously defined in the discussions of the fourth embodiment of the present invention. Given rule Q, each transition sequence is independent, and $p(T|Q, \zeta)$ can be expressed as $$p(T|Q,\zeta) = \prod_{j=1}^{n} p(T_j|Q,\zeta)$$

Taking into account the difference between observed and actual transition, $p(T_j|Q, \zeta)$ can be expressed $$p(T_j|Q,\zeta) = \sum_{S_j \in Z^{NT}} p(T_j|S_j)p(S_j|Q,\zeta)$$

where the sum is over all possible actual transitions.

$p(S_j|Q, \zeta)$ is the only remaining unknown. Since each variable has independent rules, $$p(S_j|Q,\zeta) = \prod_{k=0}^{NI} p(S_k^{t-T,j} \ldots S_k^{t,j}|Q_k,\zeta)$$

Since M must be less than T for the transitions to be lengthy enough to be of use, $$p(S_k^{t-T,j} \ldots S_k^{t,j}|Q_k,\zeta) = \prod_{\tau=T-T-M}^{t} p(S_k^{\tau,j}|S_k^{\tau-M,j} \ldots S_k^{\tau-1,j}, Q_k, \zeta)$$

where the first M−1 observations have been ignored. As is known by persons of ordinary skill of the art, a more extensive probabilistic approach could accommodate them in this calculation. The final step is to note that $p(s_k^{\tau,j}, \ldots)$ is given exactly by $Q_k$ $$p(s_k^{\tau,j}|s_k^{\tau-Mj} \ldots s_k^{\tau-1j}, Q_k, \zeta) = \delta(S_k^\tau, q_k^{[s_{0t-1,j}, \ldots s_{N-1t-1,j}, s_{0t-2,j}, \ldots s_{N-1j t-2}, \ldots s_{0t-Mj}, s_{N-1, t-Mj}]})$$

which completes the derivations needed for $p(Q|T)$.

A sixth embodiment of the present invention presents a simplification of the extended time model of the previously described embodiments. This approach addresses a convergence problem associated with Markovian GRNs of order greater than one. In these GRNs, the large number of inputs to each network function can greatly slow convergence of $g_i$ and $h_i$ to the correct network functions. Many transitions would have to be observed to achieve convergence.

The sixth embodiment significantly reduces the required number of observed transitions and achieves more rapid convergence to the correct network functions by taking into account the types of responses of GRNs being studied. With biological GRNs, for example, a sequence of reactions comprising transcription and translation of the gene into protein are initiated when a gene is activated. Because these steps take time and because an mRNA's or protein's concentration gradually increases until it exceeds some threshold for it to be able to regulate another gene, there is an inherent delay between gene activation and its effects on other genes. Generally, once this concentration threshold is met, the activated gene maintains a constant production rate of the mRNA or protein until the activated gene is deactivated. Simultaneously, the MRNA or protein is slowly degraded, but generally on a much slower time scale than gene activation.

The sixth embodiment assumes that certain Boolean or multilevel logic configurations trigger gene i to transition from 0 to 1 after a $T_i^{0 \to 1}$, $1 \leq T_i^{0 \to 1} \leq T_{max}$ time step delay.

If gene i is already active, then there is no change. Similarly, other Boolean configurations trigger gene i to turn off or stay off after a delay of $T_i^{1 \to 0}$ time steps. The network functions are then of the form $$x_i^t = f_i(\vec{x}^{t-T_i 0 \to 1}, \vec{x}^{t-T_i 1 \to 0}) \tag{36}$$

where $T_i^{0 \to 1}$ and $T_i^{1 \to 0}$ are parameters of the function. Equation (36) is not an equality, as it reflects a simplification that does not hold under all circumstances. If gene i is activated and then deactivated before $T_i^{0 \to 1}$ time steps have passed, or activation follows deactivation before $T_i^{1 \to 0}$ time steps, this simplification can yield erroneous results as explained in detail below.

This approach is similar to the Bayesian approaches of the other embodiments discussed above if the $q_i^x$ are redefined as follows:

$$q_i^{\vec{x}} = \begin{cases} 0: & (\vec{x}^{t-T_i^{1 \to 0}} = \vec{x}) \Rightarrow x_i^t = 0 \\ 1: & (\vec{x}^{t-T_i^{0 \to 1}} = \vec{x}) \Rightarrow x_i^t = 1 \\ -1: & \text{otherwise.} \end{cases} \tag{37}$$

To use this alternative approach in the Bayesian formulation, the sixth embodiment notates the observed transition series as $$T = \{T_j, j=1 \ldots n\}$$

$$T_j = \{\vec{x}^{t-Tj} \to \vec{x}^{t-T-1j} \to \ldots \to \vec{x}^{tj}\} \tag{38}$$

For simplicity, the time steps for all transition series are labeled from t−T to t. The derivations below can be extended for series of different lengths and with different time indices in a straight-forward manner.

The probability of a given set of network functions Q and time lags $\vec{T} = \{T_i^{0 \to 1}, T_i^{1 \to 0}, i=0 \ldots N-1\}$ given transition series T is given by $$p(Q, \vec{T}|T, \zeta) = c\, p(T|Q, \vec{T}, \zeta)\, p(Q, \vec{T}|\zeta) \tag{39}$$

where c is a proportionality constant. The prior distribution on the network functions and time lags can be of any form, depending on how knowledgeable one is about the problem. With no knowledge of the specific genes involved, the priors for each site i can be regarded as independent and identically distributed and be written as $$p(Q, \vec{T}|\zeta) = \prod_{i=0}^{N-1} p(Q_i|\zeta) p(T_i^{0 \to 1}, T_i^{1 \to 0}|\zeta). \tag{40}$$

The network functions can be assigned prior probabilities using the same approach as for the fourth embodiment. The time lags can be assigned prior probabilities by canvassing the literature. One useful approach for the activation time course is modeled in H. H. McAdams and A. Arkin. Stochastic mechanisms in gene expression. *PNAS*, 94:814–819, 1997, the contents of which are herein incorporated by reference.

The likelihood function in Eqn. 39 can be expressed in terms of the likelihoods for each transition series $T_j$ and each site i independently.

$$p(T \mid Q, \vec{T}, \zeta) = \prod_{j=1}^{n} p(T_j \mid Q, \vec{T}, \zeta) \quad (41)$$

$$= \prod_{j=1}^{n} \prod_{i=0}^{N-1} p(T_j \mid Q_i, T_i^{0 \to 1}, T_i^{1 \to 0}, \zeta)$$

In the noiseless case, the likelihood function for a single transition series and a single site is 0 if at least one of the $q_i^{\vec{x}}$ functions are not satisfied and 1 otherwise. Define function $\Delta(x, y)$ as $$\Delta(x, y) = \begin{cases} 1: & x = -1 \text{ or } y = -1 \\ \delta(x, y): & \text{otherwise.} \end{cases} \quad (42)$$

Taking the product over every observed transition for which it is possible to check the $q_i^{\vec{x}}$ functions gives $$p_{noiseless}(T_j \mid Q_i, T_i^{0 \to 1}, T_i^{1 \to 0}, \zeta) = \left[ \prod_{\tau = T_i^{0 \to 1}+1}^{T} \Delta\left(q_i^{\vec{x}^{\tau - T_i^{0 \to 1}, j}}, x_i^{\tau, j}\right) \right] * \quad (43)$$

$$\left[ \prod_{\tau = T_i^{1 \to 0}+1}^{T} \Delta\left(q_i^{\vec{x}^{\tau - T_i^{1 \to 0}, j}}, x_i^{\tau, j}\right) \right]$$

The first product ensures that all occurrences of $x_i=0$ in transition series j do not occur $T_i^{0 \to 1}$ time steps after a state $\vec{x}$ that should activate gene i. The second product ensures that all occurrences of $x_i=1$ do not occur $T_i^{1 \to 0}$ time steps after a state $\vec{x}$ that should deactivate gene i. The $\Delta$ function serves to make sure $x_i$ is only considered when the system state $\vec{x}$ the appropriate number of time steps ago dictates the present state of $\vec{x}$.

For the noisy observations case, the likelihood function must sum over all possible actual past states and all possible present values for gene i in the same manner as in Eqn. 29. Define $T_j$ as the j'th observed transition series and $S_j$ as the actual j'th transition series. Then the likelihood in the noisy case is $$p_{noise}(T_j \mid Q_i, T_i^{0 \to 1}, T_i^{1 \to 0}, \zeta) = \quad (44)$$

$$\sum_{S_j} p(T_j \mid S_j) p_{noiseless}(S_j \mid Q_i, T_i^{0 \to 1}, T_i^{1 \to 0}, \zeta)$$

$p(T_j|S_j)$ relates the actual to the observed transition series and is calculated using a noise model such as for the fifth embodiment. The second term in Eqn. 44 is given by Eqn. 43 with the actual transitions substituted for those observed.

With the time lag simplification and the redefinition of the q variables, this alternate approach to the extended time problem of the sixth embodiment is similar to that for the first order Markov Bayesian case. Even so, the likelihood function for observing a transition series with activation and deactivation lags is far more complex than for the first order Markov Bayesian case. Since $T_i^{1 \to 0} \neq T_i^{0 \to 1}$ there can be conflicting signals to gene $x_i$. Depending on the relative timing of activation and deactivations signals, gene i may not activate or inactivate as expected. The approach defined for the sixth embodiment will work provided there are few conflicting events in the observed transitions.

In another aspect of the sixth embodiment, the interaction between the activating and deactivating signals are modeled by a hidden Markov model whose prior probabilities reflect the frequency of various genetic regulatory mechanisms. This aspect addresses the problem with conflicting observations, such as a deactivating signal following an activation signal before the gene actually activates. These conflicting observations may cause the noiseless likelihood function to yield conflicting results. With a small number of conflicts in a large set of observed transitions, the errors will cause lags to be estimated with a small error though the triggering gene states should still be found correctly. However, the noisy likelihood function will perform worse with each additional conflict in the observations. Accordingly, the hidden Markov model of this aspect of the sixth embodiment is required with larger numbers of conflicts.

The extended time likelihood function can be extended to multilevel logic in the same manner as described for previous embodiments. In this instance, the activation and deactivation lags include all possible transitions amongst the m values for $x_i^t$: $T_i^{0 \to 1}$, $T_i^{0 \to 2}$, ..., $t_i^{0 \to v_{m-1}}$, $T_i^{1 \to 0}$, ..., $T_i^{v_m \to v_{m-1}}$. Once there are sufficient logic levels m; however, it may be computationally less expensive to use the high-order Markovian approach of the previous embodiments.

In another aspect of the present invention, the method avoids processing for unrealistic network rules from a space of possible network rules. The method identifies a set of constraints on the space of possible network rules and checks the space of possible network rules against the constraints to identify the unrealistic rules. Exemplary constraints include limits on the abstract properties which are used to define the prior probability distributions. For example, the method avoids processing the network rules which have values of the influence variable $K_i, 0 \leq K_i \leq N$ exceeding an identified limit.

Additional exemplary constraints include dependency requirements among the network variables $x_i$, i=0, ... N−1. For example, the method identifies network variables which influence other network variables based on an understanding of the underlying genetic mechanism. Alternatively, required dependencies are identified by canvassing the literature. Accordingly, the method avoids processing the network rules $f_i$, i=0, ... N−1 which do not have the required dependencies among the network variables $x_i$, i=0, ... N−1.

Figure 8:
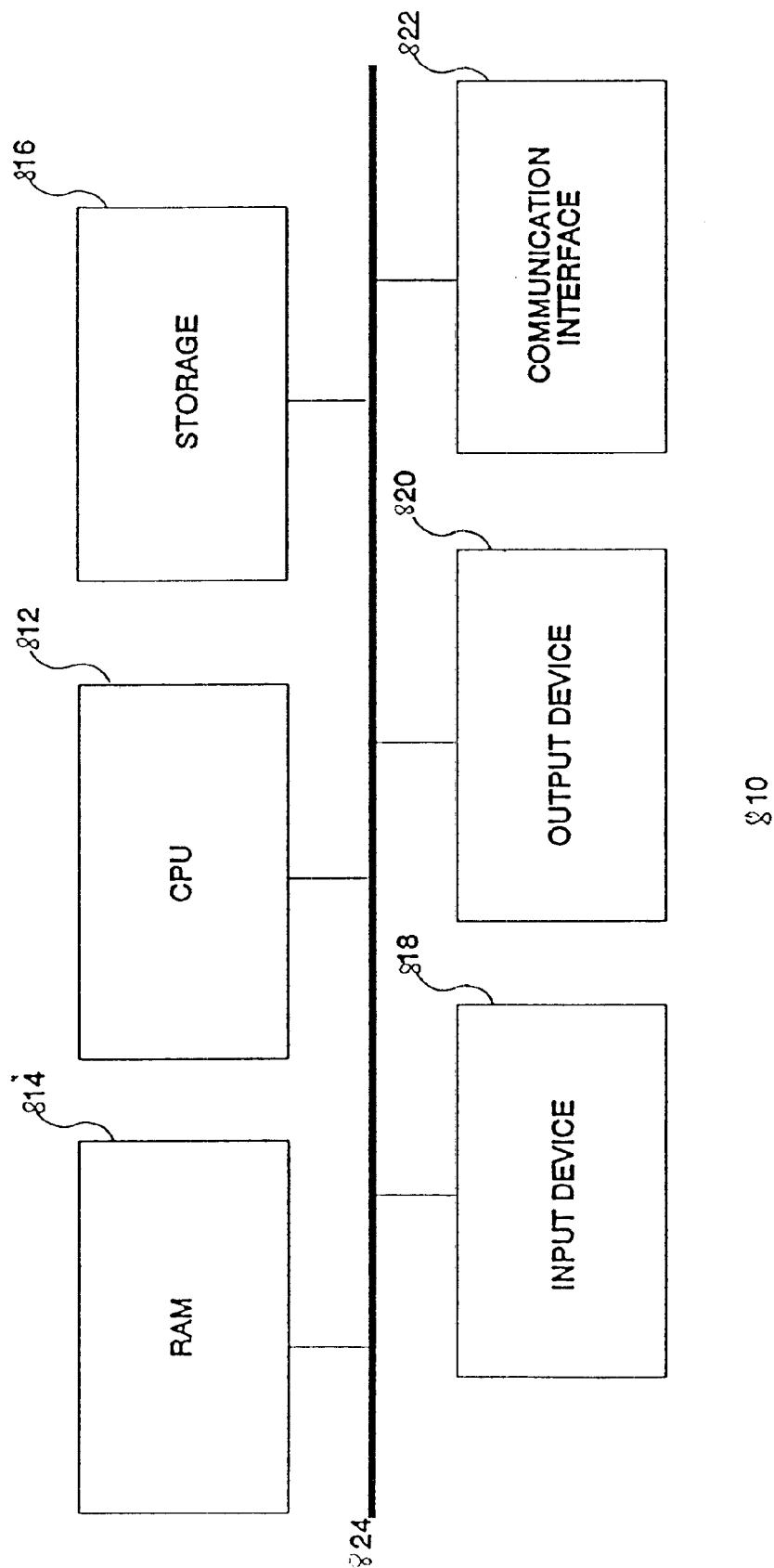
FIG. 8 discloses a representative computer system in conjunction with which the embodiments of the present invention may be implemented.

FIG. 8 discloses a representative computer system 810 in conjunction with which the embodiments of the present invention may be implemented. Computer system 810 may be a personal computer, workstation, or a larger system such as a minicomputer. However, one skilled in the art of computer systems will understand that the present invention is not limited to a particular class or model of computer.

As shown in FIG. 8, representative computer system 810 includes a central processing unit (CPU) 812, a memory unit 814, one or more storage devices 816, an input device 818, an output device 820, and communication interface 822. A system bus 824 is provided for communications between these elements. Computer system 810 may additionally function through use of an operating system such as Windows, DOS, or UNIX. However, one skilled in the art of computer systems will understand that the present invention is not limited to a particular operating system.

Storage devices 816 may illustratively include one or more floppy or hard disk drives, CD-ROMs, DVDs, or tapes. Input device 818 comprises a keyboard, mouse, microphone, or other similar device. Output device 820 is a computer monitor or any other known computer output device. Communication interface 822 may be a modem, a network interface, or other connection to external electronic devices, such as a serial or parallel port.

Exemplary configurations of the representative computer system 810 include client-server architectures, parallel computing, distributed computing, the Internet, etc. However, one skilled in the art of computer systems will understand that the present invention is not limited to a particular configuration.

While the above invention has been described with reference to certain preferred embodiments, the scope of the present invention is not limited to these embodiments. One skilled in the art may find variations of these preferred embodiments which, nevertheless, fall within the spirit of the present invention, whose scope is defined by the claims set forth below.

What is claimed is:

1. A method for creating a network model of a real world system of interacting components having a plurality of expression levels from prior knowledge and a plurality of observations of the real world system comprising the steps of:

defining N network variables $x_i$, i=0, ... N−1 having values, $v_i$, i=1, ... m to represent the components of the real world system, said values defining a network state of said network model;

defining N network rules $f_i$, i=0, ... N−1 corresponding to said N network variables from a space of possible network rules wherein said N network rules have outputs defining said network model;

defining N prior distributions corresponding to said N network rules expressing probabilities of said possible network rules from the prior knowledge of the real world system;

defining at least one likelihood function expressing the probability of making the system observations for said possible network rules;

determining N posterior distributions defined as a product of said prior distributions and said at least one likelihood function wherein said posterior distributions express the probabilities of said possible network rules given the prior knowledge and the plurality of observations of the real world system; and defining at least one placeholder value u to represent an unknown expression level for said N network variables, $x_i$, i=0, ... N−1.

2. A method for creating a network model of a real world system of interacting components having a plurality of expression levels from prior knowledge and a plurality of observations of the real world system as in claim 1 wherein said N prior distributions are uniform probability distributions.

3. A method for creating a network model of a real world system of interacting components having a plurality of expression levels from prior knowledge and a plurality of observations of the real world system comprising the steps of:

defining N network variables $x_i$, i=0, ... N−1 having values, $v_i$, i=1, ... m to represent the components of the real world system, said values defining a network state of said network model;

defining N network rules $f_i$, i=0 ... N−1 corresponding to said N network variables from a space of possible network rules wherein said N network rules have outputs defining said network model;

defining N prior distributions corresponding to said N network rules expressing probabilities of said possible network rules from the prior knowledge of the real world system;

defining at least one likelihood function expressing the probability of making the system observations for said possible network rules;

determining N posterior distributions defined as a product of said prior distributions and said at least one likelihood function wherein said posterior distributions express the probabilities of said possible network rules given the prior knowledge and the plurality of observations of the real world system; and selecting one or more of said posterior distributions having the greatest probability to identify said network model of the real world system;

wherein said defining N prior distributions step comprises the step of defining said N prior probability distributions as an expression of a plurality of abstract properties of said N network rules.

4. A method for creating a network model of a real world system of interacting components having a plurality of expression levels from prior knowledge and a plurality of observations of the real world system as in claim 3 wherein the network model comprises at least one of a multi-level logic network model, a boolean network model or a genetic regulatory network.

5. A method for creating a network model of a real world system of interacting components having a plurality of expression levels from prior knowledge and a plurality of observations of the real world system as in claim 3 wherein said defining said N prior probability distributions as an expression of a plurality of abstract properties step further comprises the steps of:

defining N influence variables $K_i, 0 \leq K_i \leq N$ corresponding to said N network rules $f_i$, each of said influence variables is the number of said N network variables effecting said corresponding network rule $f_i$;

defining N canalizing variables $C_i, 0 \leq C_i \leq N$; corresponding to said N network rules, each of said canalizing variables is the number of said N network variables for which one value completely determines the output of said corresponding network rule $f_i$; and defining N equivalence variables $P_i, 0 \leq K_i \leq N$ corresponding to said N network rules, each of said equivalence variables is the fraction of the outputs of said corresponding network rule $f_i$ having the same value.

6. A method for creating a network model of a real world system of interacting components having a plurality of expression levels from prior knowledge and a plurality of observations of the real world as in claim 5 wherein said defining said N prior probability distributions as an expression of a plurality of abstract properties step further comprises the step of decomposing said N prior probability distributions as:

$$p(P_i, C_i, K_i) = p(P_i|C_i, K_i)p(C_i|K_i)p(K_i)$$

wherein:

p(K) is the distribution of said influence variable;

p(C|K) is the distribution of said canalizing variable for a given value of said influence variable; and p(P|C, K) is the distribution of the fraction of the outputs having the same value for given values of said influence variable and said canalizing variable.

7. A method for creating a network model of a real world system of interacting components having a plurality of expression levels from prior knowledge and a plurality of observations of the real world as in claim 5 wherein said defining said N prior probability distributions as an expression of a plurality of abstract properties step further comprises the step of decomposing said N prior probability distributions as:

$$p(P_i, C_i, K_i) = p(P_i|C_i, K_i)p(K_i|C_i)p(C_i)$$

wherein:
p(C) is the distribution of said canalizing variable;
p(K|C) is the distribution of said influence variable for a given value of said canalizing variable; and
p(P|C, K) is the distribution of the fraction of the outputs having the same value for given values of said influence variable and said canalizing variable.

8. A method for creating a network model of a real world system of interacting components having a plurality of expression levels from prior knowledge and a plurality of observations of the real world as in claim 5 wherein said defining said N prior probability distributions as an expression of a plurality of abstract properties step further comprises the step of decomposing said N prior probability distributions as:

$$p(P_i, C_i, K_i) = p(K_i|C_i, P_i)p(C_i|P_i)p(P_i)$$

wherein:
p(P) is the distribution of the fraction of the outputs having the same value;
p(C|P) is the distribution of said canalizing variable for a given value of the fraction of the outputs having the same value; and
p(K|C, P) is the distribution of the fraction of the outputs having the same value for given values of said canalizing variable and the fraction of the outputs having the same value.

9. A method for creating a network model of a real world system of interacting components having a plurality of expression levels from prior knowledge and a plurality of observation of the real world system as in claim 5 further comprising the step of defining said space of possible network rules.

10. A method for creating a network model of a real world system of interacting components having a plurality of observations of the real world system as in claim 9 wherein said defining said space of possible network rules step comprises the steps of:
identifying at least one constraint on said space of possible network rules;
checking said space of possible network rules against said at least one constraint to identify a set of unrealistic network rules; and
removing said set of unrealistic rules from consideration for faster identification of said network model of the real world system.

11. A method for creating a network model of a real world system of interacting components having a plurality of expression levels from prior knowledge and a plurality of observation of the real world system as in claim 10 wherein said at least one constraint comprises a set of limits on said plurality of abstract properties.

12. A method for creating a network mode of a real world system of interacting components having a plurality of expression levels from prior knowledge and a plurality of observations of the real world system as in claim 11 wherein said at least one constraint comprises a maximum value for said influence variable $K_i$.

13. A method for creating a network model of a real world system of interacting components having a plurality of expression levels from prior knowledge and a plurality of observations of the real world system as in claim 10 wherein said at least one constraint comprises a set of dependency requirements among said N network variables, $x_i$, i=0, ... N−1.

14. A method for creating a network model of a real world system of interacting components having a plurality of expression levels from prior knowledge and a plurality of observations of the real world system comprising the steps of:
defining N network variables $x_i$, i=0, ... N−1 having values, $v_i$, i=1, ... m to represent the components of the real world system, said values defining a network state of said network model;
defining N network rules $f_i$, i=0 ... N−1 corresponding to said N network variables from a space of possible network rules wherein said N network rules have outputs defining said network model;
defining N prior distributions corresponding to said N network rules expressing probabilities of said possible network rules from the prior knowledge of the real world system;
defining at least one likelihood function expressing the probability of making the system observations for said possible network rules;
determining N posterior distributions defined as a product of said prior distributions and said at least one likelihood function wherein said posterior distributions express the probabilities of said possible network rules given the prior knowledge and the plurality of observations of the real world system;
defining a sequence of discrete time steps t, t−1, ... t−T individually referenced by τ; and
defining said network state $\vec{x}^\tau$ of said network model at said discrete time step τ as a vector of said values, $x_i^\tau \in \{v_1, \ldots v_m\}$, i=0, ... N−1 at said time step τ.

15. A method for creating a network model of a real world system of interacting components having a plurality of expression levels from prior knowledge and a plurality of observations of the real world system as in claim 14 wherein said N network rules are defined as $x_i^t = f_i(\vec{x}^{t-1}, \vec{x}^{t-2}, \vec{x}^{t-3}, \ldots \vec{x}^{t-T})$ wherein each of said N network rules $f_i$, i=0 ... N−1 determines the value for said corresponding variable $x_i$ at said time step t, $x_i^t$, from said network state $\vec{x}^\tau$ said time steps, τ=t=1 ... t−T.

16. A method for creating a network model of a real world system of interacting components having a plurality of expression levels from prior knowledge and a plurality of observations of the real world system as in claim 15 wherein the observations are noiseless and said at least one likelihood function is defined as:

$$p(T \mid Q, \zeta) = \prod_{j=1}^{n} p(\vec{x}^j \to \vec{y}^j \mid Q, \zeta)$$

$$= \prod_{j=1}^{n} \prod_{i=0}^{N-1} \delta(q_i^j, y_i^j)$$

wherein T={$\vec{x}^j \to \vec{y}^j$, j=1 ... n} is a plurality of network state transitions corresponding to the plurality of observations of the real world system;

$$p(\vec{x}^j \to \vec{y}^j \mid Q, \zeta) = \prod_{i=0}^{N-1} \delta(q_i^{\vec{x}^j}, y_i^j)$$

is the likelihood function for said transition $j(\vec{x}^j \to \vec{y}^j)$;

$q_i^{\vec{x}}$ is a binary value which determines the output of said network rule $f_i$ to input $\vec{x}$ wherein $q_i^{\vec{x}}=1$ means $x_i^t=1$ when $\vec{x}^{t-1}=\vec{x}$, and $q_i^{\vec{x}}=0$ means $x_i^t=0$ when $\vec{x}^{t-1}=\vec{x}$;

$Q_i=\{q_i^{\vec{x}}, \vec{x} \in Z^N\}$ wherein $Z^N$ is the space of all binary sequences of length N;

$Q=\{Q_i, i=0 \ldots N-1\}$;

$\delta(a, b)$ is the Kronecker delta function wherein $\delta(a, b)=1$ for $a=b$ and 0 otherwise; and $\zeta$ is any additional data affecting said network model.

17. A method for creating a network model of a real world system of interacting components having a plurality of expression levels from prior knowledge and a plurality of observations of the real world system as in claim 15 wherein each of said N network rules, $f_i$, determines said next state at said time step t, $x_i^t$, from said network state $\vec{x}^\tau$ at said time step $\tau=t-1$.

18. A method for creating a network model of a real world system of interacting components having a plurality of expression levels from prior knowledge and a plurality of observations of the real world system as in claim 17 wherein the observations are noisy and said at least one likelihood function is defined as:

$$p(T \mid Q, \zeta) = \prod_{j=1}^{n} \sum_{\vec{w} \in Z^N} \left( \prod_{i=0}^{N-1} h(q_i^{\vec{w}}, y_i^j) \right) \left( \prod_{k=0}^{N-1} h(w_k, x_k^j) \right)$$

wherein $q_i^{\vec{w}}$ is a binary value which determines the output of said network rule $f_i(\vec{x}^{t-1})$ to input $\vec{w}$ wherein $q_i^{\vec{w}}=1$ means $f_i^t=1$ when $\vec{x}^{t-1}=\vec{w}$, and $q_i^{\vec{w}}=0$ means $f_i(\vec{x}^{t-1})=0$ when $\vec{x}^{t-1}=\vec{w}$;

$Q_i=\{q_i^{\vec{w}}, \vec{w} \in Z^N\}$ wherein $Z^N$ is the space of all binary sequences of length N;

$Q=\{Q_i, i=0 \ldots N-1\}$;

$$\prod_{k=0}^{N-1} h(w_k, x_k^j)$$

is the probability of observing input state $\vec{x}$ given actual input state $\vec{w}$; and $$\prod_{i=0}^{N-1} h(q_i^{\vec{w}}, y_i^j)$$

is the probability of observing output state $\vec{y}$ given actual input state $\vec{w}$;

$h(a, b)$ accounts for the probability of changes in said values and is defined as:

$$h(a, b) = \begin{cases} p_0: & a=0, b=0 \\ p_1: & a=1, b=1 \\ 1-p_1: & a=0, b=1 \\ 1-p_0: & a=1, b=0 \end{cases};$$

and $\zeta$ is any additional data affecting said network model.

19. A method for creating a network model of a real world system of interacting components having a plurality of expression levels from prior knowledge and a plurality of observation of the real world system as in claim 15 wherein the observations are noisy and said at least one likelihood function is defined as:

$$p(T \mid Q, \zeta) = \prod_{j=1}^{n} p(T_j \mid Q, \zeta)$$

wherein:

T is a plurality of observed transition series, $\{T_j, j=1 \ldots n\}$;

$T_j=\{\vec{x}^{t-Tj} \to \vec{x}^{t-T+1j} \to \ldots \vec{x}^{tj}\}$ is a jth one of said plurality of observed transition series;

$Q_i=\{q_i^{\vec{y}}, \vec{y} \in Z^{NM}\}$ wherein $\vec{y}$ is a concatenation of said network states for said sequence of time steps having length M;

$Z^{NM}$ is a space of all binary sequences of length N*M; and $q_i^{\vec{y}}$ is a binary value which determines the output of said network rule, $f_i^t(\vec{x}^{t-1}, \vec{x}^{t-2} \ldots \vec{x}^{t-M})$ to input $\vec{y}$ wherein $q_i^{\vec{y}}=1$ means $f_i^t=1$ when $(\vec{x}^{t-1}, \vec{x}^{t-2} \ldots \vec{x}^{t-M})=\vec{y}$ and $q_i^{\vec{y}}=0$ means $f_i^t=$ when $(\vec{x}^{t-1}, \vec{x}^{t-2} \ldots \vec{x}^{t-M})=\vec{y}$;

$Q=\{Q_i, i=0 \ldots N-1\}$ defines said N network rules;

$\zeta$ is any additional data affecting said network model; and $P(T_j|Q, \zeta)$ is a probability of observing said jth transition series given said network rules.

20. A method for creating a network model of a real world system of interacting components having a plurality of expression levels from prior knowledge and a plurality of observation of the real world system as in claim 19 wherein said probability of observing said jth transition series given said network rules is defined as:

$$p(T_j \mid Q, \zeta) = \sum_{S_j \in Z^{NT}} p(T_j \mid S_j) p(S_j \mid Q, \zeta)$$

wherein

S is a plurality of actual transition series, $\{S_j, j=1 \ldots n\}$;

$S_j=\{\vec{s}^{t-Tj} \to \vec{s}^{t-T+1j} \to \ldots \vec{s}^{tj}\}$;

$\vec{s}^{tj}$ is a vector of actual value of said N network variables of said jth actual transition series at said time step t, $p(T_j|S_j)$ is the probability of said jth observed transition series, $T_j$ given said jth actual transition series, $S_j$;

$p(S_j|Q, \zeta)$ is a probability of said jth actual transition series, $S_j$ given Q and $\zeta$.

21. A method for creating a network model of a real world system of interacting components having a plurality of expression levels from prior knowledge and a plurality of observation of the real world system as in claim 20 wherein said probability of said jth observed transition series $T_j$ given said jth actual transition series, $S_j$ is defined as:

$$p(T_j \mid S_j) = \prod_{\tau=t-T}^{t} \prod_{k=0}^{N-1} h(x_k^\tau, s_k^\tau)$$

wherein:

$x_k^\tau$ is an observed value of a $k^{th}$ one of said N network variables of said time step $\tau$;

$s_k^\tau$ is an actual value of the $k^{th}$ one of said N network variables at said time step $\tau$; and h(a, b) accounts for the probability of changes in said values and is defined as:

$$h(a, b) = \begin{cases} p_0: & a=0, b=0 \\ p_1: & a=1, b=1 \\ 1-p_1: & a=0, b=1 \\ 1-p_0: & a=1, b=0 \end{cases}$$

22. A method for creating a network model of a real world system of interacting components having a plurality of expression levels from prior knowledge and a plurality of observation of the real world system as in claim 20 wherein said probability of said jth actual transition series $S_j$ given Q is defined as:

$$p(S_j \mid Q, \zeta) = \prod_{k=0}^{N-1} p(s_k^{t-T,j} \ldots s_k^{t,j} \mid Q_k, \zeta)$$

wherein $s_k^{t-Tj} \ldots s_k^{tj}$ is said jth actual transition series at a $k^{th}$ one of said N network variables; and $p(s_k^{t-Tj} \ldots s_k^{tj} \mid Q_k, \zeta)$ is a probability of said jth actual transition series at said $k^{th}$ network variable given $Q_k$ and $\zeta$.

23. A method for creating a network model of a real world system of interacting components having a plurality of expression levels from prior knowledge and a plurality of observation of the real world system as in claim 22 wherein said probability of said jth actual transition series at said $k^{th}$ network variable given $Q_k$ is defined as:

$$p(s_k^{t-T,j} \ldots s_k^{t,j} \mid Q_k, \zeta) = \prod_{\tau=t-T+M}^{t} p(s_k^{\tau,j} \mid s_k^{\tau-M,j} \ldots s_k^{\tau-1,j}, Q_k, \zeta)$$

wherein:

$p(s_k^{\tau j} \mid s_k^{\tau-Mj} \ldots s_k^{\tau-1j}, Q_k, \zeta)$ is a probability of said actual value $s_k^{\tau j}$ at said $k^{th}$ network variable at $\tau^{th}$ one of said sequence of time steps given said actual values at said $k^{th}$ network variable at M previous ones of said sequence of time steps and given $Q_k$.

24. A method for creating a network model of a real world system of interacting components having a plurality of expression levels from prior knowledge and a plurality of observations of the real world system comprising the steps of:

defining N network variables $x_i$, i=0, ... N-1 having values, $v_i$, i=1, ... m to represent the components of the real world system, said values defining a network state of said network model;

defining N network rules $f_i$, i=0, ... N-1 corresponding to said N network variables from a space of possible network rules wherein said N network rules have outputs defining said network model;

defining N prior distributions corresponding to said N network rules expressing probabilities of said possible network rules from the prior knowledge of the real world system;

defining at least one likelihood function expressing the probability of making the system observations for said possible network rules; and determining N posterior distributions defined as a product of said prior distributions and said at least one likelihood function wherein said posterior distributions express the probabilities of said possible network rules given the prior knowledge and the plurality of observations of the real world system;

wherein said N network variables, $x_i$, i=0, ... N-1 have m=2 values.

25. A method for creating a network model of a real world system of interacting components having a plurality of expression levels from prior knowledge and a plurality of observations of the real world system comprising the steps of:

defining N network variables $x_i$, i=0, ... N-1 having values, $v_i$, i-1, ... m to represent the components of the real world system, said values defining a network state of said network model;

defining N activation delays $T_i^{0 \to 1}$, i=0 ... N-1, corresponding to said network variables $x_i$, i=0 ... N-1 from a space of possible activation delays; and defining N deactivation delays $T_i^{0 \to 1}$, i=0 ... N-1, corresponding to said N network variables $x_i$, i=0 ... N-1 from a space of possible deactivation delays;

defining N network rules $f_i$, i=0 ... N-1 corresponding to said N network variables from a space of possible network rules wherein said N network rules have outputs defining said network model; and determining at least one posterior distribution wherein said posterior distribution expresses the probabilities of said possible network rules, said possible activation delays and said possible deactivation delays given the prior knowledge and the plurality of observations of the real world system.

26. A method for creating a network model of a real world system of interacting components having a plurality of expression levels from prior knowledge and a plurality of observations of the real world system as in claim 25 further comprising the step of defining at least one placeholder value u to represent an unknown expression level for said N network variables, $x_i$, i=0, ... N-1.

27. A method for creating a network model of a real world system of interacting components having a plurality of expression levels from prior knowledge and a plurality of observations of the real world system as in claim 25 wherein said determining at least one posterior distribution step comprises the steps of:

defining at least one prior distribution expressing probabilities of said possible network rules, said possible activation delays and said possible deactivation delays from the prior knowledge of the real world system;

defining at least one likelihood function expressing the probability of making the system observations for each of said possible network rules, said possible activation delays and said possible deactivation delays; and defining said at least one posterior distribution as a product of said at least one prior distribution and said at least one likelihood function.

28. A method for creating a network model of a real world system of interacting components having a plurality of expression levels from prior knowledge and a plurality of observations of the real world system as in claim 27 further comprising the step of selecting one or more of said posterior distributions having the greatest probability to identify said network model of the real world system.

29. A method for creating a network model of a real world system of interacting components having a plurality of expression levels from prior knowledge and a plurality of observations of the real world system as in claim 28 wherein said defining at least one prior distribution step comprises the step of defining said at least one prior probability distribution as an expression of a plurality of abstract properties of said N network rules.

30. A method for creating a network model of a real world system of interacting components having a plurality of expression levels from prior knowledge and a plurality of observation of the real world system as in claim 29 further comprising the step of defining said space of possible network rules.

31. A method for creating a network model of a real world system of interacting components having a plurality of observations of the real world system as in claim 30 wherein said defining said space of possible network rules step comprises the steps of:

identifying at least one constraint on said space of possible network rules;

checking said space of possible network rules against said at least one constraint to identify a set of unrealistic rules; and removing said set of unrealistic rules from consideration for faster identification of said network model of the real world system.

32. A method for creating a network model of a real world system of interacting components having a plurality of expression levels from prior knowledge and a plurality of observation of the real world system as in claim 31 wherein said at least one constraint comprises a set of limits on said plurality of abstract properties.

33. A method for creating a network model of a real world system of interacting components having a plurality of expression levels from prior knowledge and a plurality of observations of the real world system as in claim 31 wherein said at least one constraint comprises a set of depending requirements among said N network variables, $x_i$, i=0, ... N–1.

34. A method for creating a network model of a real world system of interacting components having a plurality of expression levels from prior knowledge and a plurality of observations of the real world system as in claim 27 further comprising the step of defining at least one placeholder value u to represent an unknown expression level for said N network variables, $x_i$, i=0, ... N–1.

35. A method for creating a network model of a real world system of interacting components having a plurality of expression levels from prior knowledge and a plurality of observations of the real world system as in claim 27 wherein said at least one prior distribution is a uniform probability distribution.

36. A method for creating a network model of a real world system of interacting components having a plurality of expression levels from prior knowledge and a plurality of observations of the real world system as in claim 25 further comprising the steps of:

defining a sequence of discrete time steps t, t–1, ... t–T individually referenced by $\tau$; and defining said network state $\vec{x}^\tau$ of said network model at said discrete time step $\tau$ as a vector of said values, $x_i^\tau \epsilon \{v_i, \ldots v_m\}$, i=0, ... N–1 at a time step $\tau$.

37. A method for creating a network model of a real world system of interacting components having a plurality of expression levels from prior knowledge and a plurality of observations of the real world system as in claim 36 further comprising the step of:

defining a plurality of network transition series $T=\{T_j, j=1 \ldots n\}$ as $T_j = \{\vec{x}^{t-Tj} \to \vec{x}^{t-T+1j} \to \ldots \vec{x}tj\}$ corresponding to the plurality of observations of the real world system.

38. A method for creating a network model of a real world system of interacting components having a plurality of expression levels from prior knowledge and a plurality of observations of the real world system as in claim 37 wherein said N network rules are defined as $x_i^t \approx f_i(\vec{x}^{t-T_i0\to 1}, \vec{x}^{t-T_i1\to 0})$ wherein each of said network model functions $f_i$ determines a next state for said corresponding variable $x_i$ at said time step t, $x_i^t$, from said network state $\vec{x}^\tau$ at said time steps $\tau = t-T_i^{0\to 1}, t-T_i^{1\to 0}$.

39. A method for creating a network model of a real world system of interacting components having a plurality of expression levels from prior knowledge and a plurality of observations of the real world system as in claim 38 wherein said at least one likelihood function is defined as:

$$p(T \mid Q, \vec{T}, \zeta) = \prod_{j=1}^{n} p(T_j \mid Q, \vec{T}, \zeta)$$

$$= \prod_{j=1}^{n} \prod_{i=0}^{N-1} p(T_j \mid Q_i, T_i^{0\to 1}, T_i^{1\to 0}, \zeta)$$

wherein $p(T_j \mid Q_i, T_i^{0\to 1}, T_i^{1\to 0}, \zeta)$ is the likelihood function for said transition series $T_j$ and said network variable $x_i$;

$$q_i^{\vec{x}} = \begin{cases} 0: & \left(\vec{x}^{t-T_i^{1\to 0}} = \vec{x}\right) \Rightarrow x_i^t = 0 \\ 1: & \left(\vec{x}^{t-T_i^{0\to 1}} = \vec{x}\right) \Rightarrow x_i^t = 1 \\ -1: & \text{otherwise}; \end{cases}$$

$Q_i = \{q_i^{\vec{x}}, \vec{x} \epsilon Z^N\}$ wherein $Z^N$ is the space of all binary sequences of length N;

$Q = \{Q_i, i=0 \ldots N-1\}$; and $\zeta$ is any additional data affecting said network model.

40. A method for creating a network model of a real world system of interacting components having a plurality of expression levels from prior knowledge and a plurality of observations of the real world system as in claim 39 wherein the observations are noiseless and said likelihood function for said transition series $T_j$ and said network variable $x_i$ is defined as:

$$p_{noiseless}(T_j \mid Q_i, T_i^{0\to 1}, T_i^{1\to 0)}, \zeta) = \left[\prod_{\tau=T_i^{0\to 1}+1}^{T} \Delta\left(q_i^{\vec{x}^\tau - T_i^{0\to 1}, j}, x_i^{\tau,j}\right)\right] *$$

$$\left[\prod_{\tau=T_i^{1\to 0}-1}^{T} \Delta\left(q_i^{\vec{x}^\tau - T_i^{1\to 0}, j}, x_i^{\tau,j}\right)\right]$$

wherein $$\Delta(x,y) = \begin{cases} 1: & x = -1 \text{ or } y = -1 \\ \delta(x,y): & \text{otherwise.} \end{cases}$$

41. A method for creating a network model of a real world system of interacting components having a plurality of expression levels from prior knowledge and a plurality of observations of the real world system as in claim 39 wherein the observations are noisy further comprising the step of:
defining a plurality of actual network transition series $S=\{S_j, j=1 \ldots n\}$.

42. A method for creating a network model of a real world system of interacting components having a plurality of expression levels from prior knowledge and a plurality of observations of the real world system as in claim 41 wherein said likelihood function for said transition series $T_j$ and said network variable $x_i$ is defined as:

$$p_{noise}(T_j \mid Q_i, T_i^{0\to 1}, T_i^{1\to 0}, \zeta) =$$

$$\sum_{S_j} p(T_j \mid S_j) p_{noiseless}(S_j \mid Q_i, T_i^{0\to 1}, T_i^{1\to 0}, \zeta)$$

wherein $$p_{noiseless}(S_j \mid Q_i, T_i^{0\to 1}, T_i^{1\to 0}, \zeta) = \left[\prod_{\tau=T_i^{0\to 1}-1}^{T} \Delta\left(q_i^{\vec{x}^\tau - T_i^{0\to 1}, j}, w_i^{\tau,j}\right)\right] *$$

$$\left[\prod_{\tau=T_i^{1\to 0}+1}^{T} \Delta\left(q_i^{\vec{x}^\tau - T_i^{1\to 0}, j}, w_i^{\tau,j}\right)\right];$$

$$\Delta(x,y) = \begin{cases} 1: & x = -1 \text{ or } y = -1 \\ \delta(x,y): & \text{otherwise;} \end{cases} \text{ and}$$

$p(T_j|S_j)$ relates said actual network transition series to said network transition series corresponding to the plurality of observations of the real world system; and
$w_i^{\tau j}$ is the actual value of said network variable $x_i$ at said time step $\tau$ of said actual transition series $S_j$.

43. A method for creating a network model of a real world system of interacting components having a plurality of expression levels from prior knowledge and a plurality of observations of the real world system as in claim 25 wherein said N network variables, $x_i$, i=0, . . . N−1 have m=2 values.

44. A method for creating a network model of a real world system of interacting components having a plurality of expression levels from prior knowledge and a plurality of observations of the real world system as in claim 25 wherein the network model comprises at least one of a multi-level logic network model, a boolean network model or a genetic regulatory network.

45. Computer executable software code stored on a computer readable medium, the code for creating a network model of a real world system of interacting components having a plurality of expression levels from prior knowledge and a plurality of observations of the real world system, the code comprising:
code to define N network variables $x_i$, i=0, . . . N−1 having values, $v_i$, i=1, . . . m to represent the components of the real world system, said values defining a network state of said network model;
code to define N network rules $f_i$, i=0, . . . N−1 corresponding to said N network variables from a space of possible network rules wherein said N network rules have outputs defining said network model;
code to define N prior distributions corresponding to said N network rules expressing probabilities of said possible network rules from the prior knowledge of the real world system;
code to define at least one likelihood function expressing the probability of making the system observations for said possible network rules;
code to determine N posterior distributions defined as a product of said prior distributions and said at least one likelihood function wherein said posterior distributions express the probabilities of said possible network rules given the prior knowledge and the plurality of observations of the real world system; and
code to select one or more of said posterior distributions having the greatest probability to identify said network model of the real world system;
wherein said code to define N prior distributions step comprises code to define said N prior probability distributions as an expression of a plurality of abstract properties of said N network rules.

46. A programmed computer for creating a network model of a real world system of interacting components having a plurality of expression levels from prior knowledge and a plurality of observations of the real world system comprising a memory having at least one region storing computer executable program code and a processor for executing the program code stored in said memory, wherein the program code includes:
code to define N network variables $x_i$, i=0, . . . N−1 having values, $v_i$, i=1, . . . m to represent the components of the real world system, said values defining a network state of said network model;
code to define N network rules $f_i$, i=0, . . . N−1 corresponding to said N network variables from a space of possible network rules wherein said N network rules have outputs defining said network model;
code to define N prior distributions corresponding to said N network rules expressing probabilities of said possible network rules from the prior knowledge of the real world system;
code to define at least one likelihood function expressing the probability of making the system observations for said possible network rules;
code to determine N posterior distributions defined as a product of said prior distributions and said at least one likelihood function wherein said posterior distributions express the probabilities of said possible network rules given the prior knowledge and the plurality of observations of the real world system; and
code to select one or more of said posterior distributions having the greatest probability to identify said network model of the real world system;
wherein said code to define N prior distributions step comprises code to define said N prior probability distributions as an expression of a plurality of abstract properties of said N network rules.

47. Computer executable software code stored on a computer readable medium, the code for creating a network model of a real world system of interacting components having a plurality of expression levels from prior knowledge and a plurality of observations of the real world system, the code comprising:

code to define N network variables $x_i$, i=0, ... N−1 having values, $v_i$, i=1, ... m to represent the components of the real world system, said values defining a network state of said network model;

code to define N activation delays $T_i^{0 \to 1}$, i=0 ... N−1, corresponding to said N network variables $x_i$, i=0 ... N−1 from a space of possible activation delays; and code to define N deactivation delays $T_i^{1 \to 0}$, i=0 ... N−1, corresponding to said N network variables $x_i$, i=0, ... N−1 from a space of possible deactivation delays;

code to define N network rules $f_i$, i=0, ... N−1 corresponding to said N network variables from a space of possible network rules wherein said N network rules have outputs defining said network model; and code to determine at least one posterior distribution wherein said posterior distribution expresses the probabilities of said possible network rules, said possible activation delays and said possible deactivation delays given the prior knowledge and the plurality of observations of the real world system.

48. A programmed computer for creating a network model of a real world system of interacting components having a plurality of expression levels from prior knowledge and a plurality of observations of the real world system comprising a memory having at least one region storing computer executable program code and a processor for executing the program code stored in said memory, wherein the program code includes:

code to define N network variables $x_i$, i=0, ... N−1 having values, $v_i$, i=1, ... m to represent the components of the real world system, said values defining a network state of said network model;

code to define N activation delays $T_i^{0 \to 1}$, i=0 ... N−1, corresponding to said N network variables $x_i$, i=0 ... N−1 from a space of possible activation delays; and code to define N deactivation delays $T_i^{0 \to 1}$, i=0 ... N−1, corresponding to said N network variables $x_i$, i=0 ... N−1 from a space of possible deactivation delays;

code to define N network rules $f_i$, i=0 ... N−1 corresponding to said N network variables from a space of possible network rules wherein said N network rules have outputs defining said network model; and code to determine at least one posterior distribution wherein said posterior distribution expresses the probabilities of said possible network rules, said possible activation delays and said possible deactivation delays given the prior knowledge and the plurality of observations of the real world system.

* * * * *